United States Patent
Boyer

(10) Patent No.: US 11,026,559 B2
(45) Date of Patent: Jun. 8, 2021

(54) DISHWASHER WITH IMAGE-BASED FLUID CONDITION SENSING

(71) Applicant: Midea Group Co., Ltd., Foshan (CN)

(72) Inventor: Joel Boyer, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 0 days.

(21) Appl. No.: 16/588,034

(22) Filed: Sep. 30, 2019

(65) Prior Publication Data

US 2021/0093155 A1    Apr. 1, 2021

(51) Int. Cl.
| | |
|---|---|
| A47L 15/42 | (2006.01) |
| A47L 15/00 | (2006.01) |
| G06T 7/00 | (2017.01) |
| H04N 5/225 | (2006.01) |
| H04N 5/232 | (2006.01) |
| H04N 7/18 | (2006.01) |

(52) U.S. Cl.
CPC ....... *A47L 15/4297* (2013.01); *A47L 15/0063* (2013.01); *A47L 15/4225* (2013.01); *A47L 15/4244* (2013.01); *G06T 7/001* (2013.01); *H04N 5/2253* (2013.01); *H04N 5/2256* (2013.01); *H04N 5/23296* (2013.01); *H04N 7/183* (2013.01)

(58) Field of Classification Search
CPC ............. A47L 15/4297; A47L 15/0063; A47L 15/4225; G06T 7/001; H04N 5/2253; H04N 4/2256
See application file for complete search history.

(56) References Cited

U.S. PATENT DOCUMENTS

| | | |
|---|---|---|
| 2,734,520 A | 2/1956 | Abresch |
| 2,808,063 A | 10/1957 | Abresch et al. |
| 2,939,465 A | 6/1960 | Kesling |
| 2,956,572 A | 10/1960 | Levit et al. |
| 2,973,907 A | 3/1961 | Abresch et al. |
| 2,980,120 A | 4/1961 | Jacobs |
| 3,006,557 A | 10/1961 | Jacobs |
| 3,026,046 A | 3/1962 | Wickham et al. |
| 3,044,842 A | 7/1962 | Abresch et al. |
| 3,051,183 A | 8/1962 | Jacobs |
| 3,082,779 A | 3/1963 | Jacobs |
| 3,088,474 A | 5/1963 | Leslie |
| 3,101,730 A | 8/1963 | Harris et al. |

(Continued)

FOREIGN PATENT DOCUMENTS

| | | |
|---|---|---|
| CN | 2094961 U | 2/1992 |
| CN | 1879547 A | 12/2006 |

(Continued)

OTHER PUBLICATIONS

Sokol "This is What Happens When You Put a Camera in a Dishwasher" https://www.vice.com/en_us/article/wyeyx/this-is-what-the-inside-of-a-dish-washer-cycle-looks-like, Jun. 2014.

(Continued)

*Primary Examiner* — Peter D Le

(74) *Attorney, Agent, or Firm* — Middleton Reutlinger

(57) ABSTRACT

An image-based fluid condition sensor is configured to sense turbidity or another condition of fluid in the sump of a dishwasher using an image device positioned outside of the sump.

21 Claims, 20 Drawing Sheets

(56) References Cited

U.S. PATENT DOCUMENTS

| | | | |
|---|---|---|---|
| 3,115,306 A | 12/1963 | Graham | |
| 3,178,117 A | 4/1965 | Hanifan | |
| 3,192,935 A | 7/1965 | Hanifan | |
| 3,210,010 A | 10/1965 | Delapena | |
| 3,324,867 A | 6/1967 | Freese | |
| 3,348,775 A | 10/1967 | Flame | |
| 3,361,361 A | 1/1968 | Schutte | |
| 3,454,784 A | 7/1969 | Wantz et al. | |
| 3,538,927 A | 11/1970 | Harald | |
| 3,586,011 A | 6/1971 | Mazza | |
| 3,590,688 A | 7/1971 | Brannon | |
| 3,596,834 A | 8/1971 | Cushing | |
| 3,719,323 A | 3/1973 | Raiser | |
| 3,888,269 A * | 6/1975 | Bashark | A47L 15/0047 134/57 D |
| 4,175,575 A | 11/1979 | Cushing | |
| 4,226,490 A | 10/1980 | Jenkins et al. | |
| 4,398,562 A | 8/1983 | Saarem et al. | |
| 4,718,440 A | 1/1988 | Hawker et al. | |
| 4,732,323 A | 3/1988 | Jarvis et al. | |
| 5,131,419 A | 7/1992 | Roberts | |
| 5,211,190 A | 5/1993 | Johnson et al. | |
| 5,226,454 A | 7/1993 | Cabalfin | |
| 5,291,626 A * | 3/1994 | Molnar | A47L 15/4297 8/158 |
| 5,341,827 A | 8/1994 | Kim | |
| 5,477,576 A * | 12/1995 | Berkcan | D06F 34/22 8/158 |
| 5,586,567 A * | 12/1996 | Smith | A47L 15/4297 134/57 D |
| 5,697,392 A | 12/1997 | Johnson et al. | |
| 5,725,002 A | 3/1998 | Payzant | |
| 5,800,628 A * | 9/1998 | Erickson | A47L 15/0031 134/18 |
| 6,053,185 A | 3/2000 | Cirjak et al. | |
| 6,431,188 B1 | 8/2002 | Laszczewski, Jr. et al. | |
| 6,675,818 B1 | 1/2004 | Schrott et al. | |
| 6,694,990 B2 | 2/2004 | Spanyer et al. | |
| 6,869,029 B2 | 3/2005 | Ochoa et al. | |
| 7,055,537 B2 | 6/2006 | Elick et al. | |
| 7,210,315 B2 | 5/2007 | Castelli et al. | |
| 7,293,435 B2 | 11/2007 | Elexpuru et al. | |
| 7,445,013 B2 | 11/2008 | VanderRoest et al. | |
| 7,464,718 B2 | 12/2008 | McIntyre et al. | |
| 7,556,049 B2 | 7/2009 | Oakes et al. | |
| 7,578,303 B2 | 8/2009 | Daume et al. | |
| 7,587,916 B2 | 9/2009 | Rizzetto | |
| 7,594,513 B2 | 9/2009 | VanderRoest et al. | |
| 7,607,325 B2 | 10/2009 | Elexpuru et al. | |
| 7,650,765 B2 | 1/2010 | Rizzetto | |
| 7,842,137 B2 | 11/2010 | Classen et al. | |
| 7,914,625 B2 | 3/2011 | Bertsch et al. | |
| 7,935,194 B2 | 5/2011 | Rolek | |
| 7,959,744 B2 | 6/2011 | Sundaram et al. | |
| 8,136,537 B2 | 3/2012 | Cerrano et al. | |
| 8,191,560 B2 | 6/2012 | Mallory et al. | |
| 8,229,161 B2 | 7/2012 | Hudnut et al. | |
| 8,443,765 B2 | 5/2013 | Hollis | |
| 8,509,473 B2 | 8/2013 | Ashrafzadeh et al. | |
| 8,696,827 B2 | 4/2014 | Buddharaju et al. | |
| 8,858,729 B2 | 10/2014 | Büsing et al. | |
| 8,900,375 B2 | 12/2014 | Beaudet et al. | |
| 8,915,257 B2 | 12/2014 | Buesing | |
| 8,932,411 B2 | 1/2015 | Pyo et al. | |
| 8,978,674 B2 | 3/2015 | Wagner | |
| 8,985,128 B2 | 3/2015 | Ashrafzadeh et al. | |
| 9,121,217 B1 | 9/2015 | Hoffberg | |
| 9,170,584 B2 | 10/2015 | Lum et al. | |
| 9,204,780 B2 | 12/2015 | Francisco et al. | |
| 9,220,393 B2 | 12/2015 | Becker et al. | |
| 9,241,604 B2 | 1/2016 | Dries | |
| 9,259,137 B2 | 2/2016 | Boyer et al. | |
| 9,265,400 B2 | 2/2016 | Bigott | |
| 9,307,888 B2 | 4/2016 | Baldwin et al. | |
| 9,326,657 B2 | 5/2016 | Thiyagarajan | |
| 9,468,956 B2 | 10/2016 | Simundic et al. | |
| 9,480,389 B2 | 11/2016 | Haft et al. | |
| 9,492,055 B2 | 11/2016 | Feddema | |
| 9,532,700 B2 | 1/2017 | Welch | |
| 9,635,994 B2 | 5/2017 | Boyer et al. | |
| 9,649,008 B2 | 5/2017 | Kim et al. | |
| 9,655,496 B2 | 5/2017 | Baldwin et al. | |
| 9,763,552 B2 | 9/2017 | Chapman et al. | |
| 9,915,356 B2 | 3/2018 | Chang et al. | |
| 9,958,073 B2 | 5/2018 | Yang | |
| 9,993,134 B2 | 6/2018 | Dreossi et al. | |
| 10,080,477 B2 | 9/2018 | Fauth et al. | |
| 10,105,031 B2 | 10/2018 | Dreossi et al. | |
| 10,169,881 B2 * | 1/2019 | Karasawa | H04N 5/23206 |
| 10,307,035 B2 | 6/2019 | Chen et al. | |
| 2002/0062849 A1* | 5/2002 | Ekelhoff | A47L 15/4297 134/113 |
| 2003/0034052 A1* | 2/2003 | Kiesler | A47L 15/4244 134/18 |
| 2004/0079400 A1* | 4/2004 | Young | A47L 15/0018 134/57 D |
| 2005/0011544 A1 | 1/2005 | Rosenbauer et al. | |
| 2005/0139240 A1 | 6/2005 | Bong et al. | |
| 2005/0155393 A1* | 7/2005 | Wright | D06F 43/00 68/3 R |
| 2005/0231716 A1* | 10/2005 | Ryu | G06T 7/001 356/318 |
| 2005/0241680 A1 | 11/2005 | Noh | |
| 2005/0241681 A1 | 11/2005 | Hwang | |
| 2006/0278258 A1 | 12/2006 | Kara et al. | |
| 2007/0046942 A1* | 3/2007 | Ng | D06F 34/22 356/442 |
| 2007/0181162 A1* | 8/2007 | Classen | A47L 15/4295 134/25.2 |
| 2007/0272272 A1 | 11/2007 | Choi et al. | |
| 2008/0128001 A1* | 6/2008 | Kennichi | A47L 15/0021 134/18 |
| 2008/0163904 A1 | 7/2008 | Hwang | |
| 2008/0271765 A1 | 11/2008 | Burrows | |
| 2008/0276975 A1 | 11/2008 | Disch | |
| 2009/0071508 A1 | 3/2009 | Sundaram et al. | |
| 2009/0090400 A1 | 4/2009 | Burrows et al. | |
| 2009/0145468 A1 | 6/2009 | Chericoni | |
| 2009/0231581 A1* | 9/2009 | Han | A47L 15/0018 356/341 |
| 2010/0043826 A1 | 2/2010 | Bertsch et al. | |
| 2010/0175718 A1* | 7/2010 | Kedjierski | G01F 23/247 134/18 |
| 2010/0294311 A1 | 11/2010 | Classen et al. | |
| 2011/0017235 A1 | 1/2011 | Berner et al. | |
| 2011/0186085 A1 | 8/2011 | Chen et al. | |
| 2012/0060875 A1* | 3/2012 | Fauth | A47L 15/4295 134/56 D |
| 2012/0138092 A1* | 6/2012 | Ashrafzadeh | A47L 15/4295 134/18 |
| 2012/0175431 A1 | 7/2012 | Althammer et al. | |
| 2012/0291827 A1 | 11/2012 | Buddharaju et al. | |
| 2013/0000762 A1 | 1/2013 | Buddharaju et al. | |
| 2013/0171023 A1 | 7/2013 | Ben-shmuel et al. | |
| 2013/0319483 A1 | 12/2013 | Welch | |
| 2014/0059880 A1 | 3/2014 | Bertsch et al. | |
| 2014/0069470 A1 | 3/2014 | Baldwin et al. | |
| 2014/0111071 A1* | 4/2014 | Bhajak | A47L 15/22 312/228.1 |
| 2014/0190519 A1* | 7/2014 | Simundic | A61G 9/02 134/18 |
| 2014/0373876 A1 | 12/2014 | Feddema | |
| 2015/0002658 A1* | 1/2015 | Jaw | G01F 23/0069 348/135 |
| 2015/0007861 A1 | 1/2015 | Azmi et al. | |
| 2015/0201823 A1 | 7/2015 | Poojary et al. | |
| 2015/0266065 A1 | 9/2015 | Savoia | |
| 2016/0096020 A1 | 4/2016 | Smith | |
| 2016/0198928 A1 | 7/2016 | Xu et al. | |
| 2016/0324396 A1 | 11/2016 | Hong et al. | |
| 2016/0367107 A1 | 12/2016 | Ellingson et al. | |
| 2017/0172371 A1 | 6/2017 | Engesser et al. | |

(56) References Cited

U.S. PATENT DOCUMENTS

| | | | |
|---|---|---|---|
| 2017/0181599 A1 | 6/2017 | Choi et al. | |
| 2017/0202426 A1* | 7/2017 | Bosen | A47L 15/4295 |
| 2017/0224190 A1 | 8/2017 | Sakthivel et al. | |
| 2017/0231464 A1 | 8/2017 | Kong et al. | |
| 2017/0273535 A1 | 9/2017 | Roderick et al. | |
| 2017/0332877 A1 | 11/2017 | Pers et al. | |
| 2017/0354308 A1 | 12/2017 | Choi et al. | |
| 2018/0036889 A1 | 2/2018 | Birkmeyer et al. | |
| 2018/0084967 A1 | 3/2018 | Ross et al. | |
| 2018/0107879 A1 | 4/2018 | Laput et al. | |
| 2018/0110397 A1 | 4/2018 | Kim et al. | |
| 2018/0132692 A1 | 5/2018 | Dries | |
| 2018/0133583 A1* | 5/2018 | Tran | H04W 84/18 |
| 2018/0168425 A1 | 6/2018 | Wilson et al. | |
| 2018/0192851 A1 | 7/2018 | Gursoy et al. | |
| 2018/0304293 A1 | 10/2018 | Orla-jensen et al. | |
| 2019/0380559 A1 | 12/2019 | Lee et al. | |
| 2020/0000310 A1* | 1/2020 | Chu | A47L 15/4287 |
| 2020/0138261 A1 | 5/2020 | Terrádez et al. | |
| 2020/0138263 A1* | 5/2020 | Terradez Alemany | A47L 15/0028 |
| 2021/0068612 A1 | 3/2021 | Park | |

FOREIGN PATENT DOCUMENTS

| | | |
|---|---|---|
| CN | 101134198 A | 3/2008 |
| CN | 201067392 Y | 6/2008 |
| CN | 101795613 A | 8/2010 |
| CN | 102370450 A | 3/2012 |
| CN | 102512128 A | 6/2012 |
| CN | 102940476 A | 2/2013 |
| CN | 203447254 U | 2/2014 |
| CN | 203749364 U | 8/2014 |
| CN | 104523208 A | 4/2015 |
| CN | 104757921 A | 7/2015 |
| CN | 204671085 U | 9/2015 |
| CN | 105147218 A | 12/2015 |
| CN | 105231971 A | 1/2016 |
| CN | 205094364 U | 3/2016 |
| CN | 107485356 A | 12/2017 |
| DE | 3537184 A1 | 4/1987 |
| DE | 10048081 A1 | 4/2002 |
| DE | 10121083 A1 | 10/2002 |
| DE | 10300501 A1 | 7/2004 |
| DE | 202004013786 U1 | 11/2004 |
| DE | 102008011743 A1 | 9/2009 |
| DE | 202014010365 U1 | 5/2015 |
| DE | 102014215660 A1 | 1/2016 |
| DE | 102015103040 A1 | 9/2016 |
| EP | 0559466 A1 | 9/1993 |
| EP | 0679365 A1 | 11/1995 |
| EP | 0764421 A1 | 3/1997 |
| EP | 0786231 A2 | 7/1997 |
| EP | 0864291 A1 | 9/1998 |
| EP | 0943287 A1 | 9/1999 |
| EP | 1132038 A2 | 9/2001 |
| EP | 1136030 A1 | 9/2001 |
| EP | 1238622 A2 | 9/2002 |
| EP | 1252856 A2 | 10/2002 |
| EP | 1632166 A2 | 3/2006 |
| EP | 1635167 A1 | 3/2006 |
| EP | 1758494 A1 | 3/2007 |
| EP | 2636786 A1 | 9/2013 |
| EP | 2059160 B1 | 3/2015 |
| EP | 3498145 A1 | 6/2016 |
| EP | 3427630 A1 | 1/2019 |
| FR | 1473796 A | 3/1967 |
| GB | 572623 A | 10/1945 |
| GB | 2244209 A | 11/1991 |
| JP | 2003235781 A | 8/2003 |
| JP | 2003339607 A | 12/2003 |
| JP | 2009273490 A | 11/2009 |
| JP | 2014121353 A | 7/2014 |
| JP | 2017144240 A | 8/2017 |
| KR | 100786069 B1 | 12/2007 |
| KR | 101173691 B1 | 8/2012 |
| KR | 200464747 Y1 | 1/2013 |
| KR | 101387609 B1 | 4/2014 |
| WO | WO2009008827 A1 | 1/2009 |
| WO | WO2011080232 A1 | 7/2011 |
| WO | WO2012173479 A1 | 12/2012 |
| WO | WO2016008699 A1 | 1/2016 |
| WO | WO2016096020 A1 | 6/2016 |
| WO | WO2017032629 A1 | 3/2017 |
| WO | WO2018053635 A1 | 3/2018 |
| WO | WO2018108285 A1 | 6/2018 |
| WO | WO2018114363 A1 | 6/2018 |
| WO | WO2018228679 A1 | 12/2018 |

OTHER PUBLICATIONS

"Technology" sensorsllc.com/technology.html, Sensor Systems, 2017.
"Magnet Sensors in Dish washer Spray Arm Jam Detection" https://www.reed-sensor.com/applications/white-goods/spray-arm-jam-detection/ Accessed Jul. 2, 2019.
"Intelligent Dishwasher Outsmarks Dirt" https://www.designnews.com/electronics-test/intelligent-dishwasher-soutsmarts-dirt/151626670139713. Design News, Apr. 1995.
"LG Electronics, LG Connected Appliances Lead Home Kitchens Into the Future: Network of Appliances Offers Seamless Connectivity with LG InstaView ThinQ Refrigerator, EasyClean Oven Range and QuadWash Dishwasher", https://www.prnewswire.com/news-releases/lg-connected-appliances-lead-home-kitchens-into-the-future-300578674, Jan. 7, 2018.
Sears "Kenmore Elite 2013 Stainless Steel Tall Tub Dishwasher Service Manual", Dec. 5, 2018.
DE10121083A1 machine translation (Year: 2002).
Everyspec, Federal Specification: Dishwashing Machines, Single Tank and Double Tank, Commercial, www.everyspec.com, Oct. 17, 1983.
Electrolux Home Products, Inc. "Dishwasher Use & Care Guide 1500 Series with Fully Electronic Control" 2003.
Transmittal of Related Applications.
U.S. Patent and Trademark Office, Non-Final Office Action issued in U.S. Appl. No. 16/587,826 dated Apr. 14, 2021.
U.S. Patent and Trademark Office, Office Action issued in U.S. Appl. No. 16/587,820 dated Apr. 19, 2021.

* cited by examiner

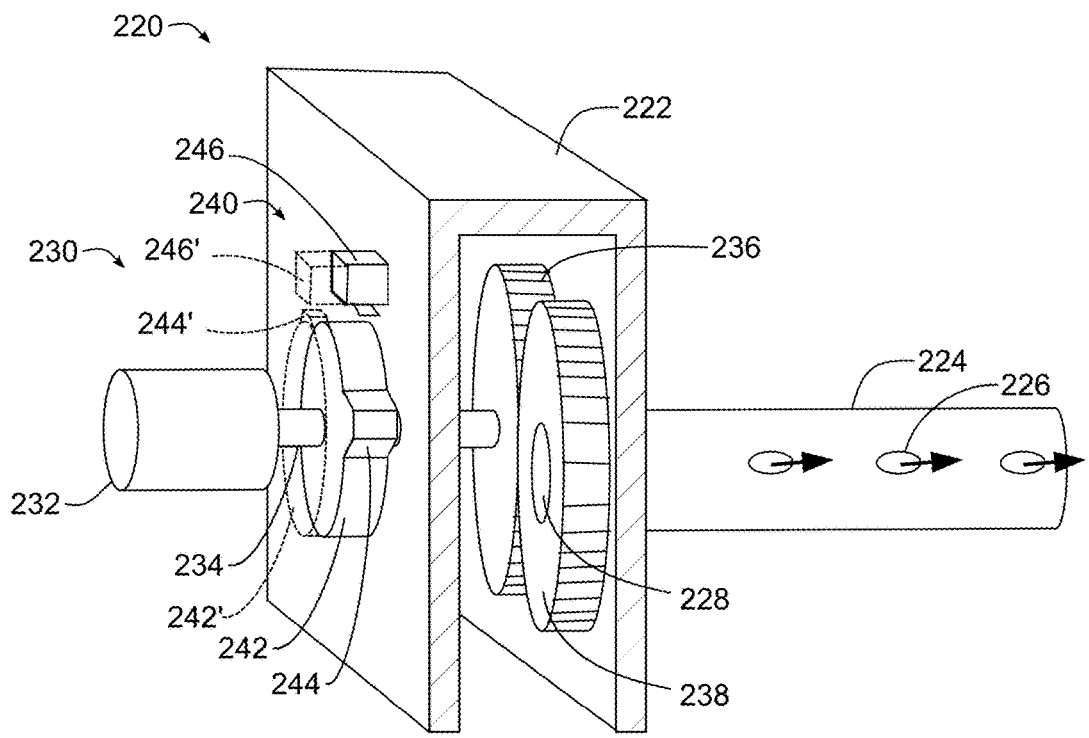
FIG. 7
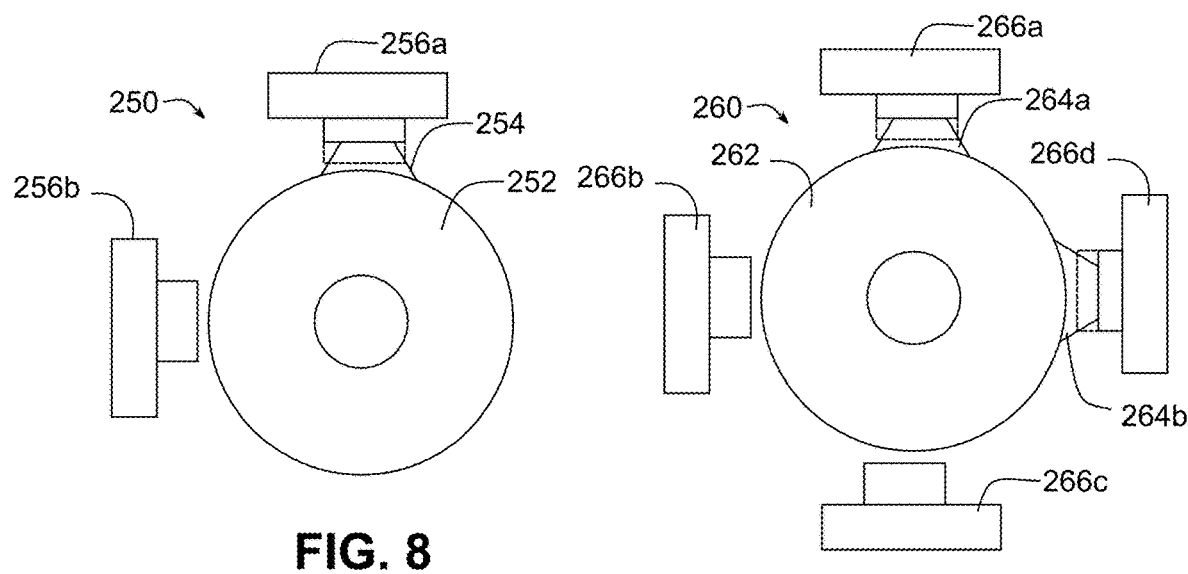
FIG. 8
FIG. 9

DISHWASHER WITH IMAGE-BASED FLUID CONDITION SENSING

BACKGROUND

Dishwashers are used in many single-family and multi-family residential applications to clean dishes, silverware, cutlery, cups, glasses, pots, pans, etc. (collectively referred to herein as "utensils"). Many dishwashers rely primarily on rotatable spray arms that are disposed at the bottom and/or top of a tub and/or are mounted to a rack that holds utensils. A spray arm is coupled to a source of wash fluid and includes multiple apertures for spraying wash fluid onto utensils, and generally rotates about a central hub such that each aperture follows a circular path throughout the rotation of the spray arm. The apertures may also be angled such that force of the wash fluid exiting the spray arm causes the spray arm to rotate about the central hub.

While traditional spray arm systems are simple and mostly effective, they have the shortcoming of that they must spread the wash fluid over all areas equally to achieve a satisfactory result. In doing so, resources such as time, energy and water are generally wasted because wash fluid cannot be focused precisely where it is needed. Moreover, because spray arms follow a generally circular path, the corners of a tub may not be covered as thoroughly, leading to lower cleaning performance for utensils located in the corners of a rack. In addition, in some instances the spray jets of a spray arm may be directed to the sides of a wash tub during at least portions of the rotation, leading to unneeded noise during a wash cycle.

Various efforts have been made to attempt to customize wash cycles to improve efficiency as well as wash performance, e.g., using cameras and other types of image sensors to sense the contents of a dishwasher, as well as utilizing spray arms that provide more focused washing in particular areas of a dishwasher. Nonetheless, a significant need still exists in the art for greater efficiency and efficacy in dishwasher performance.

SUMMARY

The herein-described embodiments address these and other problems associated with the art by providing an image-based fluid condition sensor that is configured to sense a turbidity or other condition of fluid in the sump of a dishwasher using an image device positioned outside of the sump.

Therefore, consistent with one aspect of the invention, a dishwasher may include a wash tub including a sump, an imaging device positioned above the sump and configured to capture images of the sump, an illumination source disposed in the sump and directed at the imaging device, and a controller coupled to the imaging device and the illumination source and configured to sense a turbidity of a fluid disposed in the sump by controlling the illumination source to emit light, controlling the imaging device to capture one or more images of the sump while light is emitted by the illumination source, and determining a value representative of the turbidity of the fluid disposed in the sump based upon a sensed light intensity for the illumination source in the captured one or more images.

Consistent with another aspect of the invention, a dishwasher may include a wash tub including a sump, an imaging device positioned outside of the sump and configured to capture images of the sump, and a controller coupled to the imaging device and configured to sense turbidity of a fluid disposed in the sump by controlling the imaging device to capture one or more images of the sump from which a condition of the fluid in the sump may be determined.

In some embodiments, the imaging device is positioned above the sump and above a maximum fluid level for the sump. Also, in some embodiments, the controller is further configured to control the imaging device to capture one or more additional images within the dishwasher to perform a non-fluid condition sensing operation in the dishwasher. Further, in some embodiments, the non-fluid condition sensing operation is a load sensing operation, an object sensing operation, a soil sensing operation, remote viewing operation, a detergent sensing operation, a filter sensing operation, a filter cleaning operation, a fluid level sensing operation, a sprayer position sensing operation, a self-cleaning operation or a diagnostic operation.

In some embodiments, the imaging device is disposed on a wall of the wash tub and above the sump. In addition, in some embodiments, the imaging device has a fixed field of view directed at the sump. In some embodiments, the imaging device has a controllably-varied field of view, and where the controller is configured to control the imaging device to direct the field of view thereof at the sump when sensing the condition of the fluid disposed in the sump.

Some embodiments may also include a tubular spray element disposed in the wash tub and being rotatable about a longitudinal axis thereof, the tubular spray element including one or more apertures extending through an exterior surface thereof, and the tubular spray element in fluid communication with a fluid supply to direct fluid from the fluid supply into the wash tub through the one or more apertures, and a tubular spray element drive coupled to the tubular spray element and configured to rotate the tubular spray element between a plurality of rotational positions about the longitudinal axis thereof, where the controller is coupled to the tubular spray element drive and configured to control the tubular spray element drive to discretely direct the tubular spray element to each of a plurality of rotational positions. In some embodiments, the imaging device is coupled to the tubular spray element such that the controller controls a field of view of the imaging device using the tubular spray element drive.

In addition, in some embodiments, the controller is further configured to sense the condition of the fluid disposed in the sump by determining from the captured one or more images a value representative of the condition of the fluid disposed in the sump. Moreover, in some embodiments, the controller is further configured to sense the condition of the fluid disposed in the sump by communicating the captured one or more images to a remote device that determines a value representative of the condition of the fluid disposed in the sump, and receiving the determined value from the remote device.

Some embodiments may also include an illumination source configured to illuminate a portion of the sump within the field of view of the imaging device when the one or more images are captured by the imaging device. In some embodiments, the illumination source generates white light, red light, green light, a pattern of light, or infrared light. Moreover, in some embodiments, the condition of the fluid disposed in the sump is determined based upon attenuation of light emitted by the illumination source. In some embodiments, the illumination source is disposed in the sump, and the condition of the fluid is sensed based upon direct illumination by the illumination source. Some embodiments may also include a reflective element disposed in the sump, where the condition of the fluid is sensed based upon indirect illumination by the illumination source that is reflected by the reflective element.

In addition, in some embodiments, the controller is further configured to perform a calibration operation by controlling the imaging device to capture one or more images of the sump when clean water is disposed in the sump for use in determining a baseline light intensity for clear water such that the condition of the fluid in the sump may be determined based in part on a comparison of a light intensity sensed in the captured one or more images with the baseline light intensity. In some embodiments, the controller is further configured to determine a load cleanliness or a rate of soil removal based at least in part on the sensed condition of the fluid disposed in the sump.

Some embodiments may further include an imaging system including the imaging device, and the controller is configured to determine the load cleanliness or the rate of soil removal further based at least in part on one or more images captured of a load in the dishwasher by the imaging system. Also, in some embodiments, the controller is further configured to determine when to complete a wash or rinse operation performed during a wash cycle based at least in part on the sensed condition of the fluid disposed in the sump. In some embodiments, the condition is turbidity.

Consistent with another aspect of the invention, a method of sensing condition of a fluid disposed in a sump of a dishwasher may include performing image analysis on one or more images of the sump of the dishwasher captured using an imaging device positioned outside of the sump, and determining the condition of the fluid based upon the image analysis performed on the captured one or more images.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIG. 7 is a partial cross-sectional view of a tubular spray element and tubular spray element drive incorporating a cam-based position sensor consistent with the invention.

FIG. 8 is a functional end view of an alternative cam-based position sensor to that illustrated in FIG. 7, and incorporating multiple cam detectors.

FIG. 9 is a functional end view of another alternative cam-based position sensor to that illustrated in FIG. 7, and incorporating multiple cam detectors and a cam with multiple lobes.

DETAILED DESCRIPTION

Figure 1:
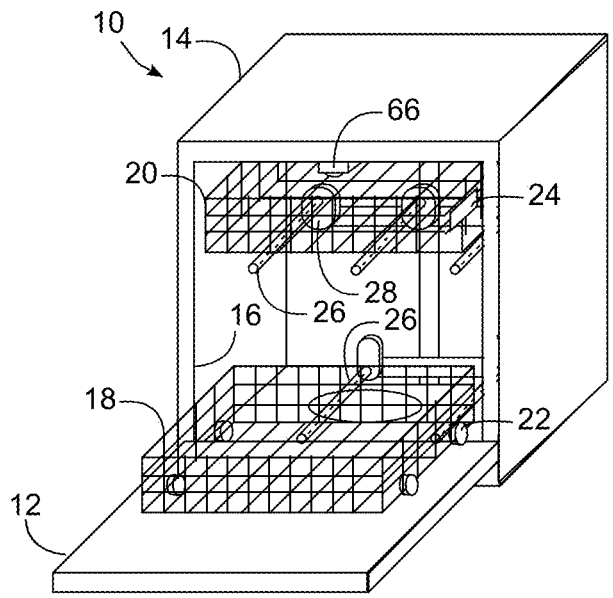
FIG. 1 is a perspective view of a dishwasher consistent with some embodiments of the invention.

In various embodiments discussed hereinafter, an imaging system may be used within a dishwasher to perform various operations within the dishwasher. An imaging system, in this regard, may be considered to include one or more cameras or other imaging devices capable of capturing images within a dishwasher. The images may be captured in the visible spectrum in some embodiments, while in other embodiments other spectrums may be captured, e.g., the infrared spectrum. Imaging devices may be positioned in fixed locations within a dishwasher in some embodiments, and in other embodiments may be positioned on movable and/or controllable components, as will become more apparent below. In addition, captured images may be analyzed locally within a dishwasher in some embodiments, while in other embodiments captured images may be analyzed remotely, e.g., using a cloud-based service. Furthermore, imaging devices may generate two dimensional images in some embodiments, while in other embodiments captured images may be three dimensional in nature, e.g., to enable surface models to be generated for structures within a dishwasher, including both components of the dishwasher and articles placed in the dishwasher to be washed. Images may also be combined in some embodiments, and in some embodiments multiple images may be combined into videos clips prior to analysis.

In some embodiments consistent with the invention, and as will become more apparent below, an imaging system may be utilized in connection with one or more controllable sprayers. A controllable sprayer, in this regard, may refer to a component capable of selectively generating a spray of fluid towards any of a plurality of particular spots, locations, or regions of a dishwasher, such that through control of the sprayer, fluid may be selectively sprayed into different spots, locations or regions as desired. When paired with an imaging system consistent with the invention, therefore, a controller of a dishwasher may be capable of controlling one or more controllable sprayers to direct fluid into specific spots, locations or regions based upon images captured by an imaging system.

In some instances, a controllable sprayer may be implemented using multiple nozzles directed at different spots, locations or regions and selectively switchable between active and inactive states. In other embodiments, however, a controllable sprayer may be a controllably-movable sprayer that is capable of being moved, e.g., through rotation, translation or a combination thereof, to direct a spray of fluid to different spots, locations or regions. Moreover, while some controllably-movable sprayers may include designs such as gantry-mounted wash arms or other sprayers, controllably-rotatable wash arms, motorized sprayers, and the like, in some embodiments, a controllably-movable sprayer may be configured as a tubular spray element that is rotatable about a longitudinal axis and discretely directed through each of a plurality of rotational positions about the longitudinal axis by a tubular spray element drive to spray a fluid such as a wash liquid and/or pressurized air in a controlled direction generally transverse from the longitudinal axis about which the tubular spray element rotates.

A tubular spray element, in this regard, may be considered to include an elongated body, which may be generally cylindrical in some embodiments but may also have other cross-sectional profiles in other embodiments, and which has one or more apertures disposed on an exterior surface thereof and in fluid communication with a fluid supply, e.g., through one or more internal passageways defined therein. A tubular spray element also has a longitudinal axis generally defined along its longest dimension and about which the tubular spray element rotates, and furthermore, a tubular spray element drive is coupled to the tubular spray element to discretely direct the tubular spray element to multiple rotational positions about the longitudinal axis. In addition, when a tubular spray element is mounted on a rack and configured to selectively engage with a dock based upon the position of the rack, this longitudinal axis may also be considered to be an axis of insertion. A tubular spray element may also have a cross-sectional profile that varies along the longitudinal axis, so it will be appreciated that a tubular spray element need not have a circular cross-sectional profile along its length as is illustrated in a number embodiments herein. In addition, the one or more apertures on the exterior surface of a tubular spray element may be arranged into nozzles in some embodiments, and may be fixed or movable (e.g., rotating, oscillating, etc.) with respect to other apertures on the tubular spray element. Further, the exterior surface of a tubular spray element may be defined on multiple components of a tubular spray element, i.e., the exterior surface need not be formed by a single integral component.

In addition, in some embodiments a tubular spray element may be discretely directed by a tubular spray element drive to multiple rotational positions about the longitudinal axis to spray a fluid in predetermined directions into a wash tub of a dishwasher during a wash cycle. In some embodiments, a tubular spray element may be mounted on a movable portion of the dishwasher, e.g., a rack, and may be operably coupled to such a drive through a docking arrangement that both rotates the tubular spray element and supplies fluid to the tubular spray element when the tubular spray element is docked in the docking arrangement. In other embodiments, however, a tubular spray element may be mounted to a fixed portion of a dishwasher, e.g., a wash tub wall, whereby no docking arrangement is used. Further details regarding tubular spray elements may be found, for example, in U.S. Pub. No. 2019/0099054 filed by Digman et al., which is incorporated by reference herein.

It will be appreciated, however, that an imaging system consistent with the invention may, in some instances, be used in a dishwasher having other types of spray elements, e.g., rotatable spray arms, fixed sprayers, etc., as well as in a dishwasher having spray elements that are not discretely directable or otherwise controllable or controllably-movable. Therefore, the invention is not limited in all instances to use in connection with the various types of sprayers described herein.

Turning now to the drawings, wherein like numbers denote like parts throughout the several views, FIG. 1 illustrates an example dishwasher 10 in which the various technologies and techniques described herein may be implemented. Dishwasher 10 is a residential-type built-in dishwasher, and as such includes a front-mounted door 12 that provides access to a wash tub 16 housed within the cabinet or housing 14. Door 12 is generally hinged along a bottom edge and is pivotable between the opened position illustrated in FIG. 1 and a closed position (not shown). When door 12 is in the opened position, access is provided to one or more sliding racks, e.g., lower rack 18 and upper rack 20, within which various utensils are placed for washing. Lower rack 18 may be supported on rollers 22, while upper rack 20 may be supported on side rails 24, and each rack is movable between loading (extended) and washing (retracted) positions along a substantially horizontal direction. Control over dishwasher 10 by a user is generally managed through a control panel (not shown in FIG. 1) typically disposed on a top or front of door 12, and it will be appreciated that in different dishwasher designs, the control panel may include various types of input and/or output devices, including various knobs, buttons, lights, switches, textual and/or graphical displays, touch screens, etc. through which a user may configure one or more settings and start and stop a wash cycle.

In addition, consistent with some embodiments of the invention, dishwasher 10 may include one or more tubular spray elements (TSEs) 26 to direct a wash fluid onto utensils disposed in racks 18, 20. As will become more apparent below, tubular spray elements 26 are rotatable about respective longitudinal axes and are discretely directable by one or more tubular spray element drives (not shown in FIG. 1) to control a direction at which fluid is sprayed by each of the tubular spray elements. In some embodiments, fluid may be dispensed solely through tubular spray elements, however the invention is not so limited. For example, in some embodiments various upper and/or lower rotating spray arms may also be provided to direct additional fluid onto utensils. Still other sprayers, including various combinations of wall-mounted sprayers, rack-mounted sprayers, oscillating sprayers, fixed sprayers, rotating sprayers, focused sprayers, etc., may also be combined with one or more tubular spray elements in some embodiments of the invention.

Some tubular spray elements 26 may be fixedly mounted to a wall or other structure in wash tub 16, e.g., as may be the case for tubular spray elements 26 disposed below or adjacent lower rack 18. For other tubular spray elements 26, e.g., rack-mounted tubular spray elements, the tubular spray elements may be removably coupled to a docking arrangement such as docking arrangement 28 mounted to the rear wall of wash tub 16 in FIG. 1.

The embodiments discussed hereinafter will focus on the implementation of the hereinafter-described techniques within a hinged-door dishwasher. However, it will be appreciated that the herein-described techniques may also be used in connection with other types of dishwashers in some embodiments. For example, the herein-described techniques may be used in commercial applications in some embodiments. Moreover, at least some of the herein-described techniques may be used in connection with other dishwasher configurations, including dishwashers utilizing sliding drawers or dish sink dishwashers, e.g., a dishwasher integrated into a sink.

Figure 2:
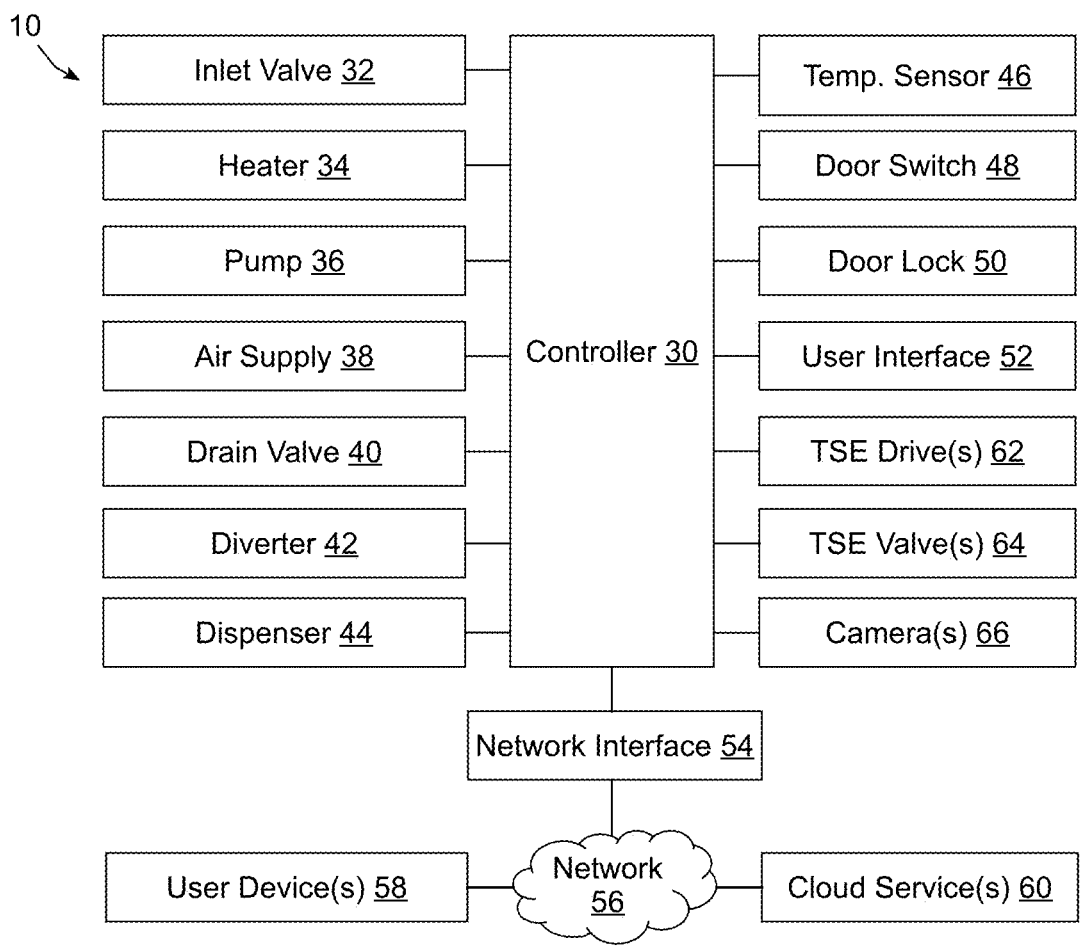
FIG. 2 is a block diagram of an example control system for the dishwasher of FIG. 1.

Now turning to FIG. 2, dishwasher 10 may be under the control of a controller 30 that receives inputs from a number of components and drives a number of components in response thereto. Controller 30 may, for example, include one or more processors and a memory (not shown) within which may be stored program code for execution by the one or more processors. The memory may be embedded in controller 30, but may also be considered to include volatile and/or non-volatile memories, cache memories, flash memories, programmable read-only memories, read-only memories, etc., as well as memory storage physically located elsewhere from controller 30, e.g., in a mass storage device or on a remote computer interfaced with controller 30.

As shown in FIG. 2, controller 30 may be interfaced with various components, including an inlet valve 32 that is coupled to a water source to introduce water into wash tub 16, which when combined with detergent, rinse agent and/or other additives, forms various wash fluids. Controller may also be coupled to a heater 34 that heats fluids, a pump 36 that recirculates wash fluid within the wash tub by pumping fluid to the wash arms and other spray devices in the dishwasher, an air supply 38 that provides a source of pressurized air for use in drying utensils in the dishwasher, a drain valve 40 that is coupled to a drain to direct fluids out of the dishwasher, and a diverter 42 that controls the routing of pumped fluid to different tubular spray elements, spray arms and/or other sprayers during a wash cycle. In some embodiments, a single pump 36 may be used, and drain valve 40 may be configured to direct pumped fluid either to a drain or to the diverter 42 such that pump 36 is used both to drain fluid from the dishwasher and to recirculate fluid throughout the dishwasher during a wash cycle. In other embodiments, separate pumps may be used for draining the dishwasher and recirculating fluid. Diverter 42 in some embodiments may be a passive diverter that automatically sequences between different outlets, while in some embodiments diverter 42 may be a powered diverter that is controllable to route fluid to specific outlets on demand. In still other embodiments, and as will be discussed in greater detail below, each tubular spray element may be separately controlled such that no separate diverter is used. Air supply 38 may be implemented as an air pump or fan in different embodiments, and may include a heater and/or other air conditioning device to control the temperature and/or humidity of the pressurized air output by the air supply.

In the illustrated embodiment, pump 36 and air supply 38 collectively implement a fluid supply for dishwasher 100, providing both a source of wash fluid and pressurized air for use respectively during wash and drying operations of a wash cycle. A wash fluid may be considered to be a fluid, generally a liquid, incorporating at least water, and in some instances, additional components such as detergent, rinse aid, and other additives. During a rinse operation, for example, the wash fluid may include only water. A wash fluid may also include steam in some instances. Pressurized air is generally used in drying operations, and may or may not be heated and/or dehumidified prior to spraying into a wash tub. It will be appreciated, however, that pressurized air may not be used for drying purposes in some embodiments, so air supply 38 may be omitted in some instances, and thus a fluid supply in some embodiments may supply various liquid wash fluids to various sprayers in the dishwasher. Moreover, in some instances, tubular spray elements may be used solely for spraying wash fluid or spraying pressurized air, with other sprayers or spray arms used for other purposes, so the invention is not limited to the use of tubular spray elements for spraying both wash fluid and pressurized air.

Controller 30 may also be coupled to a dispenser 44 to trigger the dispensing of detergent and/or rinse agent into the wash tub at appropriate points during a wash cycle. Additional sensors and actuators may also be used in some embodiments, including a temperature sensor 46 to determine a wash fluid temperature, a door switch 48 to determine when door 12 is latched, and a door lock 50 to prevent the door from being opened during a wash cycle. Moreover, controller 30 may be coupled to a user interface 52 including various input/output devices such as knobs, dials, sliders, switches, buttons, lights, textual and/or graphics displays, touch screen displays, speakers, image capture devices, microphones, etc. for receiving input from and communicating with a user. In some embodiments, controller 30 may also be coupled to one or more network interfaces 54, e.g., for interfacing with external devices via wired and/or wireless networks 56 such as Ethernet, Bluetooth, NFC, cellular and other suitable networks. External devices may include, for example, one or more user devices 58, e.g., mobile devices, desktop computers, etc., and one or more cloud services 60, e.g., as may be provided by a manufacturer of dishwasher 10. Other types of devices, e.g., devices associated with maintenance or repair personnel, may also interface with dishwasher 10 in some embodiments.

Additional components may also be interfaced with controller 30, as will be appreciated by those of ordinary skill having the benefit of the instant disclosure. For example, one or more tubular spray element (TSE) drives 62 and/or one or more tubular spray element (TSE) valves 64 may be provided in some embodiments to discretely control one or more tubular spray elements disposed in dishwasher 10, as will be discussed in greater detail below. Further, an imaging system including one or more cameras 66 (see also FIG. 1 for an example physical location of a camera 66 in dishwasher 10) may also be provided in some embodiments to provide visual information suitable for implementing some of the functionality described herein.

It will be appreciated that each tubular spray element drive 62 may also provide feedback to controller 30 in some embodiments, e.g., a current position and/or speed, although in other embodiments a separate position sensor may be used. In addition, as will become more apparent below, flow regulation to a tubular spray element may be performed without the use of a separately-controlled tubular spray element valve 64 in some embodiments, e.g., where rotation of a tubular spray element by a tubular spray element drive is used to actuate a mechanical valve.

Moreover, in some embodiments, at least a portion of controller 30 may be implemented externally from a dishwasher, e.g., within a user device 58, a cloud service 60, etc., such that at least a portion of the functionality described herein is implemented within the portion of the controller that is externally implemented. In some embodiments, controller 30 may operate under the control of an operating system and may execute or otherwise rely upon various computer software applications, components, programs, objects, modules, data structures, etc. In addition, controller 30 may also incorporate hardware logic to implement some or all of the functionality disclosed herein. Further, in some embodiments, the sequences of operations performed by controller 30 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

Numerous variations and modifications to the dishwasher illustrated in FIGS. 1-2 will be apparent to one of ordinary skill in the art, as will become apparent from the description below. Therefore, the invention is not limited to the specific implementations discussed herein.

Furthermore, additional details regarding the concepts disclosed herein may also be found in the following co-pending applications, all of which were filed on even date herewith, and all of which are incorporated by reference herein: U.S. application Ser. No. 16/588,969, entitled "DISHWASHER WITH IMAGE-BASED OBJECT SENSING," U.S. application Ser. No. 16/588,135, entitled "DISHWASHER WITH CAM-BASED POSITION SENSOR," U.S. application Ser. No. 16/587,820, entitled "DISHWASHER WITH IMAGE-BASED POSITION SENSOR," U.S. application Ser. No. 16/588,310, entitled "DISHWASHER WITH IMAGE-BASED DETERGENT SENSING," and U.S. application Ser. No. 16/587,826, entitled "DISHWASHER WITH IMAGE-BASED DIAGNOSTICS."

Tubular Spray Elements

Figure 3:
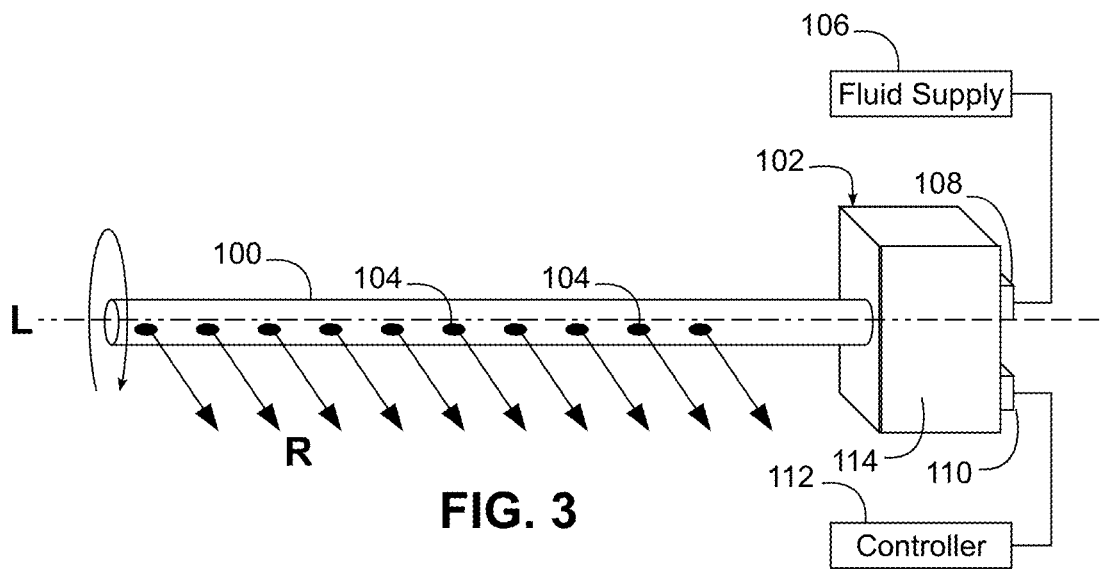
FIG. 3 is a side perspective view of a tubular spray element and tubular spray element drive from the dishwasher of FIG. 1.

Now turning to FIG. 3, in some embodiments, a dishwasher may include one or more discretely directable tubular spray elements, e.g., tubular spray element 100 coupled to a tubular spray element drive 102. Tubular spray element 100 may be configured as a tube or other elongated body disposed in a wash tub and being rotatable about a longitudinal axis L. In addition, tubular spray element 100 is generally hollow or at least includes one or more internal fluid passages that are in fluid communication with one or more apertures 104 extending through an exterior surface thereof. Each aperture 104 may function to direct a spray of fluid into the wash tub, and each aperture may be configured in various manners to provide various types of spray patterns, e.g., streams, fan sprays, concentrated sprays, etc. Apertures 104 may also in some instances be configured as fluidic nozzles providing oscillating spray patterns.

Moreover, as illustrated in FIG. 3, apertures 104 may all be positioned to direct fluid along a same radial direction from axis L, thereby focusing all fluid spray in generally the same radial direction represented by arrows R. In other embodiments, however, apertures may be arranged differently about the exterior surface of a tubular spray element, e.g., to provide spray from two, three or more radial directions, to distribute a spray over one or more arcs about the circumference of the tubular spray element, etc.

Tubular spray element 100 is in fluid communication with a fluid supply 106, e.g., through a port 108 of tubular spray element drive 102, to direct fluid from the fluid supply into the wash tub through the one or more apertures 104. Tubular spray element drive 102 is coupled to tubular spray element 100 and is configured to discretely direct the tubular spray element 100 to each of a plurality of rotational positions about longitudinal axis L. By "discretely directing," what is meant is that tubular spray element drive 102 is capable of rotating tubular spray element 100 generally to a controlled rotational angle (or at least within a range of rotational angles) about longitudinal axis L. Thus, rather than uncontrollably rotating tubular spray element 100 or uncontrollably oscillating the tubular spray element between two fixed rotational positions, tubular spray element drive 102 is capable of intelligently focusing the spray from tubular spray element 100 between multiple rotational positions. It will also be appreciated that rotating a tubular spray element to a controlled rotational angle may refer to an absolute rotational angle (e.g., about 10 degrees from a home position) or may refer to a relative rotational angle (e.g., about 10 degrees from the current position).

Tubular spray element drive 102 is also illustrated with an electrical connection 110 for coupling to a controller 112, and a housing 114 is illustrated for housing various components in tubular spray element drive 102. In the illustrated embodiment, tubular spray element drive 102 is configured as a base that supports, through a rotary coupling, an end of the tubular spray element and effectively places the tubular spray element in fluid communication with port 108.

By having an intelligent control provided by tubular spray element drive 102 and/or controller 112, spray patterns and cycle parameters may be increased and optimized for different situations. For instance, tubular spray elements near the center of a wash tub may be configured to rotate 360 degrees, while tubular spray elements located near wash tub walls may be limited to about 180 degrees of rotation to avoid spraying directly onto any of the walls of the wash tub, which can be a significant source of noise in a dishwasher. In another instance, it may be desirable to direct or focus a tubular spray element to a fixed rotational position or over a small range of rotational positions (e.g., about 5-10 degrees) to provide concentrated spray of liquid, steam and/or air, e.g., for cleaning silverware or baked on debris in a pan. In addition, in some instances the rotational velocity of a tubular spray element may be varied throughout rotation to provide longer durations in certain ranges of rotational positions and thus provide more concentrated washing in particular areas of a wash tub, while still maintaining rotation through 360 degrees. Control over a tubular spray element may include control over rotational position, speed or rate of rotation and/or direction of rotation in different embodiments of the invention.

Figure 4:
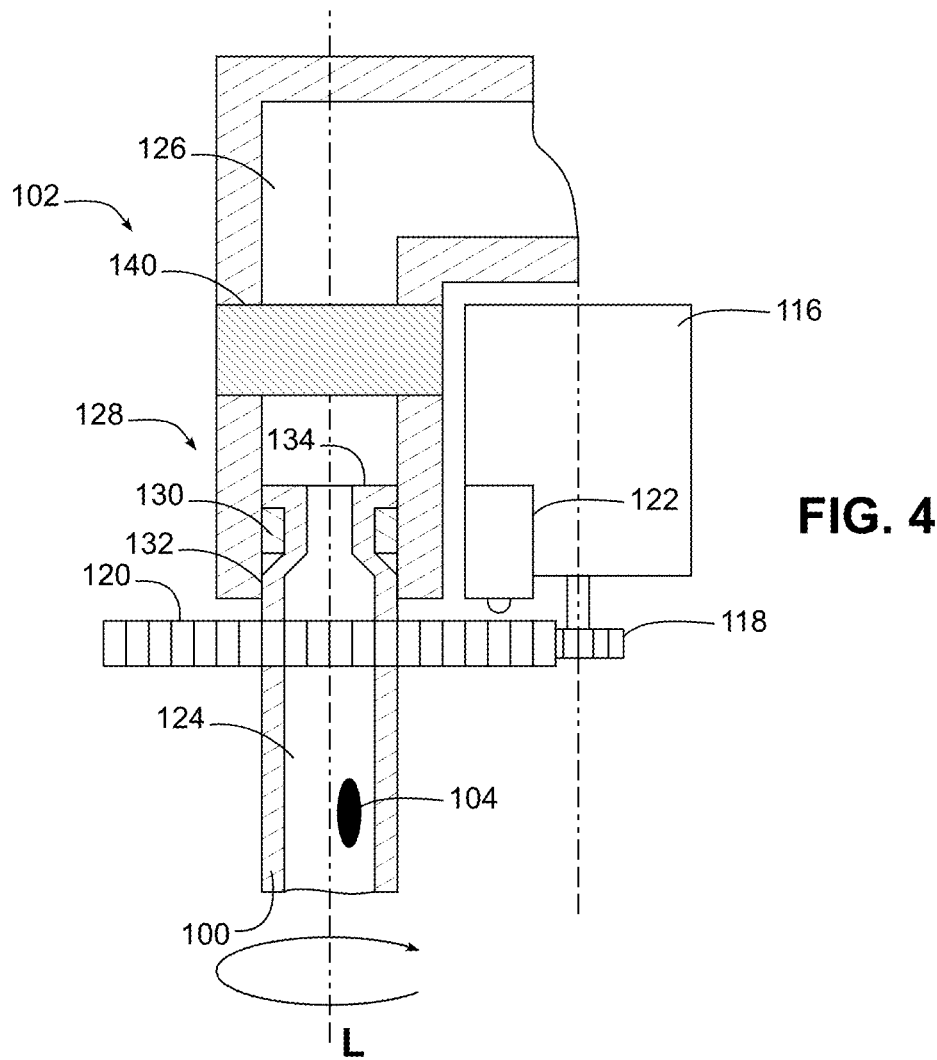
FIG. 4 is a partial cross-sectional view of the tubular spray element and tubular spray element drive of FIG. 3.

FIG. 4 illustrates one example implementation of tubular spray element 100 and tubular spray element drive 102 in greater detail, with housing 114 omitted for clarity. In this implementation, tubular spray element drive 102 includes an electric motor 116, which may be an alternating current (AC) or direct current (DC) motor, e.g., a brushless DC motor, a stepper motor, etc., which is mechanically coupled to tubular spray element 100 through a gearbox including a pair of gears 118, 120 respectively coupled to motor 116 and tubular spray element 100. Other manners of mechanically coupling motor 116 to tubular spray element 100 may be used in other embodiments, e.g., different numbers and/or types of gears, belt and pulley drives, magnetic drives, hydraulic drives, linkages, friction, etc.

In addition, an optional position sensor 122 may be disposed in tubular spray element drive 102 to determine a rotational position of tubular spray element 100 about axis L. Position sensor 122 may be an encoder or hall sensor in some embodiments, or may be implemented in other manners, e.g., integrated into a stepper motor, whereby the rotational position of the motor is used to determine the rotational position of the tubular spray element, or using one or more microswitches and a cam configured to engage the microswitches at predetermined rotational positions. Position sensor 122 may also sense only limited rotational positions about axis L (e.g., a home position, 30 or 45 degree increments, etc.). Further, in some embodiments, rotational position may be controlled using time and programming logic, e.g., relative to a home position, and in some instances without feedback from a motor or position sensor. Position sensor 122 may also be external to tubular spray element drive 102 in some embodiments.

An internal passage 124 in tubular spray element 100 is in fluid communication with an internal passage 126 leading to port 108 (not shown in FIG. 4) in tubular spray element drive 102 through a rotary coupling 128. In one example implementation, coupling 128 is formed by a bearing 130 mounted in passageway 126, with one or more deformable tabs 134 disposed at the end of tubular spray element 100 to secure tubular spray element 100 to tubular spray element drive 102. A seal 132, e.g., a lip seal, may also be formed between tubular spray element 100 and tubular spray element drive 102. Other manners of rotatably coupling the tubular spray element while providing fluid flow may be used in other embodiments.

In addition, it also may be desirable in some embodiments to incorporate a valve 140 into a tubular spray element drive 102 to regulate the fluid flow to tubular spray element 100. Valve 140 may be an on/off valve in some embodiments or may be a variable valve to control flow rate in other embodiments. In still other embodiments, a valve may be external to or otherwise separate from a tubular spray element drive, and may either be dedicated to the tubular spray element or used to control multiple tubular spray elements. Valve 140 may be integrated with or otherwise proximate a rotary coupling between tubular spray element 100 and tubular spray element drive 102. By regulating fluid flow to tubular spray elements, e.g., by selectively shutting off tubular spray elements, water can be conserved and/or high-pressure zones can be created by pushing all of the hydraulic power through fewer numbers of tubular spray elements.

In some embodiments, valve 140 may be actuated independent of rotation of tubular spray element 100, e.g., using an iris valve, butterfly valve, gate valve, plunger valve, piston valve, valve with a rotatable disk, ball valve, etc., and actuated by a solenoid, motor or other separate mechanism from the mechanism that rotates tubular spray element 100. In other embodiments, however, valve 140 may be actuated through rotation of tubular spray element 100. In some embodiments, for example, rotation of tubular spray element 100 to a predetermined rotational position may be close valve 140, e.g., where valve 140 includes an arcuate channel that permits fluid flow over only a range of rotational positions. As another example, a valve may be actuated through over-rotation of a tubular spray element or through counter rotation of a tubular spray element.

Tubular spray elements may be mounted within a wash tub in various manners in different embodiments, e.g., mounted to a wall (e.g., a side wall, a back wall, a top wall, a bottom wall, or a door) of a wash tub, and may be oriented in various directions, e.g., horizontally, vertically, front-to-back, side-to-side, or at an angle. It will also be appreciated that a tubular spray element drive may be disposed within a wash tub, e.g., mounted on wall of the wash tub or on a rack or other supporting structure, or alternatively some or all of the tubular spray element drive may be disposed external from a wash tub, e.g., such that a portion of the tubular spray element drive or the tubular spray element projects through an aperture in the wash tub. Alternatively, a magnetic drive could be used to drive a tubular spray element in the wash tub using an externally-mounted tubular spray element drive. Moreover, rather than being mounted in a cantilevered fashion as is the case with tubular spray element 100 of FIG. 3, a tubular spray element may also be mounted on a wall of a wash tub and supported at both ends. In still other embodiments, a tubular spray element may be rack-mounted, with either the associated tubular spray element drive also rack-mounted or alternatively mounted on a wall of the wash tub. It will also be appreciated that in some embodiments, multiple tubular spray elements may be driven by the same tubular spray element drive, e.g., using geared arrangements, belt drives, or other mechanical couplings. Further, tubular spray elements may also be movable in various directions in addition to rotating about their longitudinal axes, e.g., to move transversely to a longitudinally axis, to rotate about an axis of rotation that is transverse to a longitudinal axis, etc. In addition, deflectors may be used in combination with tubular spray elements in some embodiments to further the spread of fluid and/or prevent fluid from hitting tub walls. In some embodiments, deflectors may be integrated into a rack, while in other embodiments, deflectors may be mounted to a wall of the wash tub. In addition, deflectors may also be movable in some embodiments, e.g., to redirect fluid between multiple directions. Moreover, while in some embodiments tubular spray elements may be used solely to spray wash fluid, in other embodiments tubular spray elements may be used to spray pressurized air at utensils during a drying operation of a wash cycle, e.g., to blow off water that pools on cups and dishes after rinsing is complete. In some instances, different tubular spray elements may be used to spray wash fluid and spray pressurized air, while in other instances the same tubular spray elements may be used to alternately or concurrently spray wash liquid and pressurized air.

Additional features that may be utilized in a dishwasher including tubular spray elements are described, for example, in U.S. application Ser. Nos. 16/132,091, 16/132,106, 16/132,114, 16/132,125 filed on Sep. 14, 2018 and U.S. application Ser. No. 16/298,007 filed on Mar. 11, 2019, all of which are all assigned to the same assignee as the present application, and all of which are hereby incorporated by reference herein.

Imaging System

Figure 5:
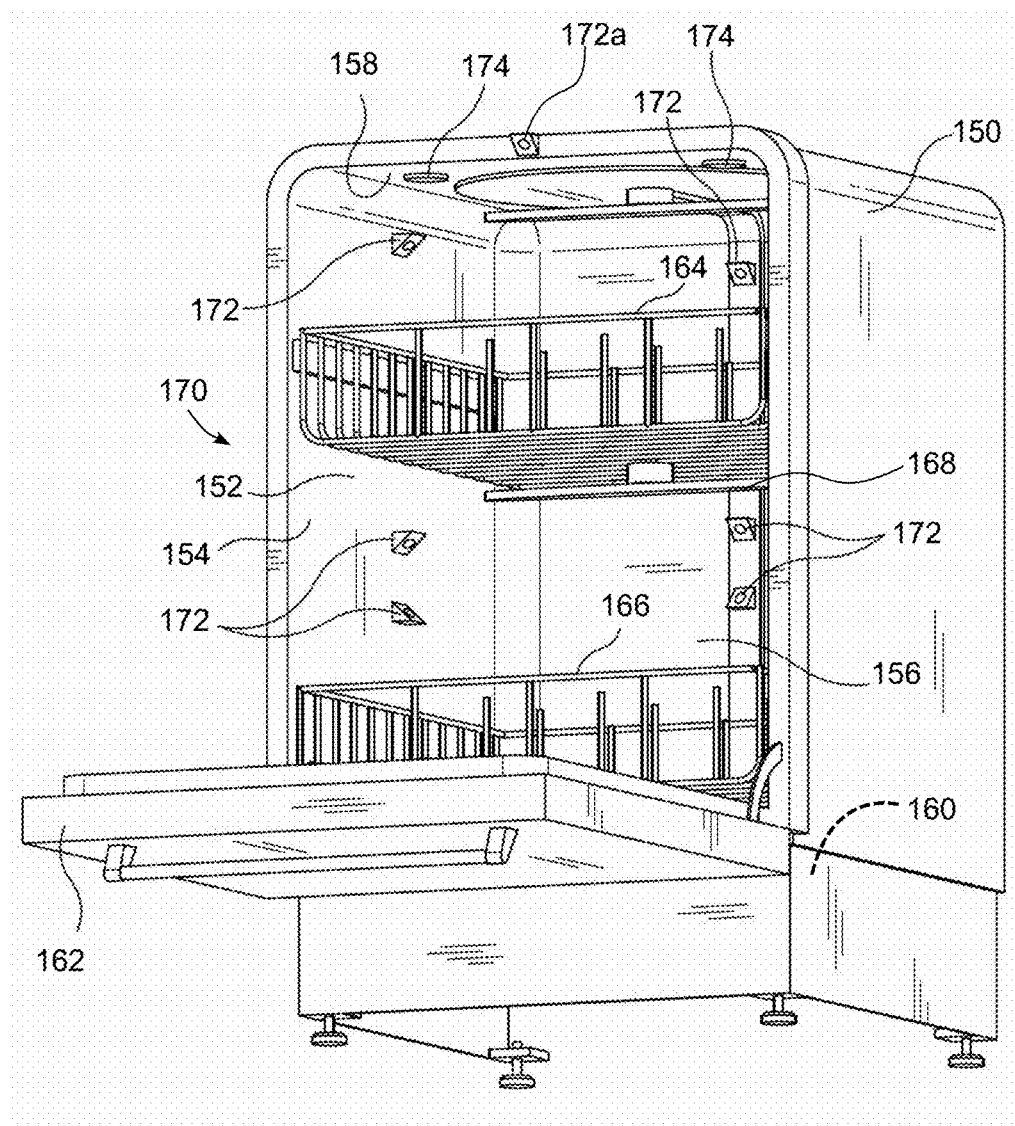
FIG. 5 is a perspective view of another dishwasher consistent with some embodiments of the invention, and incorporating an imaging system having multiple fixed cameras.

Now turning to FIG. 5, as noted above, a dishwasher consistent with the invention may also include an imaging system including one or more cameras or other imaging devices. FIG. 5, for example, illustrates an example dishwasher 150 including a wash tub 152 having side walls 154, a rear wall 156, a top wall 158 and a sump 160, a hinged door 162 providing access to the wash tub, and one or more racks, e.g., upper and lower racks 164, 166. While in some embodiments, tubular spray elements may be used to spray wash fluid throughout wash tub 152, in the embodiment illustrated in FIG. 5, one or more rotatable spray arms, e.g., spray arm 168 mounted to upper rack 164, may be used in lieu of or in addition to tubular spray elements.

An imaging system 170, including, for example, one or more cameras 172, may be used to collect image data within wash tub 152 for a variety of purposes. As noted above, cameras 172 may operate in the visible spectrum (e.g., RGB cameras) in some embodiments, or may operate in other spectra, e.g., the infrared spectrum (e.g., IR cameras), the ultraviolet spectrum, etc. Moreover, cameras 172 may collect two dimensional and/or three dimensional image data in different embodiments, may use range or distance sensing (e.g., using LIDAR), and may generate static images and/or video clips in various embodiments. Cameras may be disposed at various locations within a wash tub, including, for example, on any of walls 154, 156, 158, in corners between walls, on components mounted to walls (e.g., fluid supply conduits), in sump 160, on door 162, on any of racks 164, 166, or even on a spray arm 168, tubular spray element, or other movable component within a dishwasher. Moreover, different types of imaging devices may be used at different locations, or multiple imaging device of different types may be used at the same location (e.g., RGB in one location and IR in another, or RGB and IR in the same location). In addition, an imaging system 170 may also in some embodiments include one or more lights or other illumination devices 174 suitable for illuminating the wash tub to facilitate image collection. Illumination devices 174 may illuminate light in various spectra, including white light, infrared light, ultraviolet light, or even colored light in a particular segment of the visible spectra, e.g. a green, blue, or red light, or patterns of light (e.g., lines, grids, moving shapes, etc.), as may be desirable for particular applications, such as 3D applications. In addition, as illustrated by camera 172a, a camera may also capture image data outside of a wash tub, e.g., to capture images of a rack that has been extended to a loading position.

As noted above, and as is illustrated by cameras 172 and 172a, cameras may be fixed in some embodiments, and it may be desirable to utilize multiple cameras to ensure suitable coverage of all areas of a washtub for which it is desirable to collect image data. In other embodiments only a single camera may be used, and in addition, in some embodiments one or multiple cameras may be disposed on a movable component of a dishwasher to vary the viewpoint of the camera to capture different areas or perspectives within a dishwasher.

Figure 6:
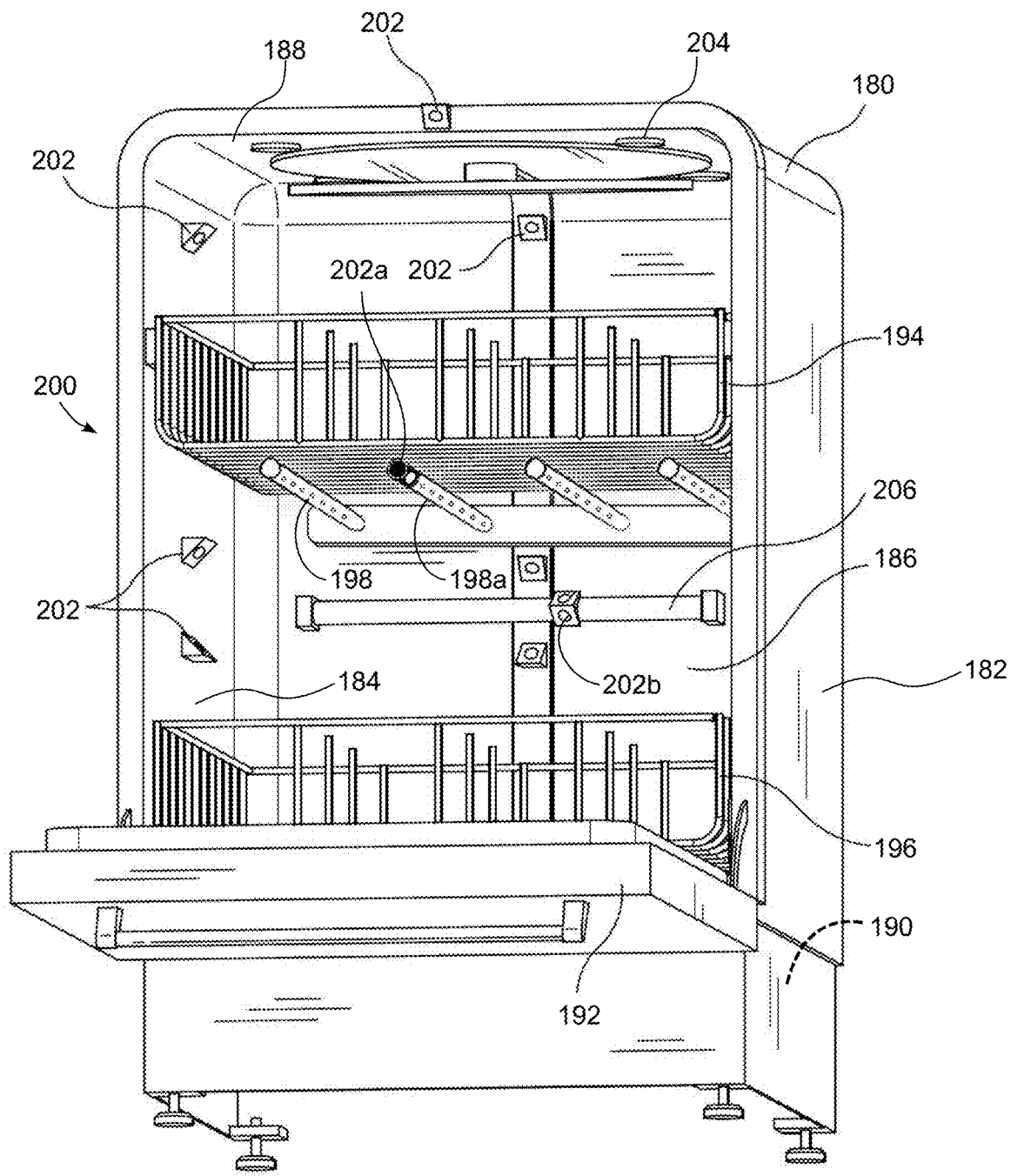
FIG. 6 is a perspective view of yet another dishwasher consistent with some embodiments of the invention, and incorporating an imaging system having multiple fixed and movable cameras.

FIG. 6, for example, illustrates an example dishwasher 180 including a wash tub 182 having side walls 184, a rear wall 186, a top wall 188 and a sump 190, a hinged door 192 providing access to the wash tub, and one or more racks, e.g., upper and lower racks 194, 196. In addition, in this embodiment, a plurality of tubular spray elements 198 are used to spray wash fluid throughout wash tub 182. An imaging system 200, including, for example, one or more cameras 202, may be used to collect image data within wash tub 182 for a variety of purposes, and one or more illumination devices 204 may also be disposed in the dishwasher for illumination purposes. As noted above, however, while some of cameras 202 may be fixed, others may be mounted on movable components. For example, a camera 202a is illustrated disposed on a spray device such as tubular spray element 198a, and it will be appreciated that the field of view of the camera may be controlled by a tubular spray element drive. As another example, camera 202b is illustrates as being disposed on a movable gantry 206, which permits horizontal and/or vertical movement of the camera. It will be appreciated that a camera may be movable and/or translatable in any number of directions and/or axes in different embodiments based upon the desired application of such camera, so the invention is not limited to the specific arrangement of cameras disclosed herein.

Tubular Spray Element Position Detection

As noted above, it may be desirable in some embodiments to additionally incorporate one or more position sensors to determine the position of a tubular spray element or other sprayer in a dishwasher. Position sensor 122 of FIG. 4, for example, is an encoder or hall sensor; however, in other embodiments, it may be desirable to utilize other position sensor implementations. It will be appreciated that due to the discrete control of a spray pattern available when utilizing tubular spray elements and other types of controllable sprayers, an ability to control and sense the trajectory of washing fluid within a dishwasher is desirable in many embodiments, as doing so may improve the effectiveness of a wash cycle, reduce cycle times, and facilitate the performance of additional operations that have heretofore not been possible in conventional dishwasher designs.

FIGS. 7-9, for example, discloses various cam-based position sensor implementations whereby one or more cams that rotate in connection with rotation of a tubular spray element may be sensed by one or more cam detectors to determine a current rotational position of a tubular spray element. In some embodiments, for example, a cam-based position sensor may be configured to sense multiple rotational positions among a plurality of rotational positions to which a tubular spray element drive may rotate an associated tubular spray element, and may include one or more cam detectors and a plurality of cam lobes operably coupled to the tubular spray element to rotate therewith.

FIG. 7, for example, illustrates a portion of a dishwasher 220 where a manifold 222 configured to be mounted on a side or rear wall of dishwasher 220 (not shown in FIG. 7) supports a tubular spray element 224 having one or more nozzles 226 configured to spray in a predetermined direction represented by the arrows in FIG. 7. Manifold 222 is in a fluid communication with a fluid supply (not shown) to convey fluid to tubular spray element 224 through an inlet port 228, and it will be appreciated that tubular spray element 224 is rotatably mounted to manifold 222 but is generally not removable therefrom. It will be appreciated however that the techniques described herein may also be used in connection with a dockable tubular spray element that is removable from a docking arrangement, e.g., where a tubular spray element is rack-mounted.

A tubular spray element drive 230 includes a motor 232, drive shaft 234 that projects through the wall of manifold 222 and a drive gear 236 that engages with a gear 238 that rotates with tubular spray element 224, such that rotation of drive shaft 234 by motor 232 rotates tubular spray element 224 through the engagement of gears 236, 238. While gears 236, 238 are illustrated as being within manifold 222, in other embodiments, the gears may be external from manifold 222, e.g., on the same side as motor 232, or alternatively, within the wash tub and on the same side as tubular spray element 224.

A cam-based position sensor 240 includes a cam 242 mounted to drive shaft 234 and including a cam lobe 244 defined at a rotational position relative to nozzles 226 of tubular spray element, e.g., at the same rotational position as nozzles 226 in some embodiments. A cam detector 246, e.g., a microswitch, is also positioned at a predetermined position about cam 242 and positioned within a path of travel of cam lobe 244 such that when cam 242 is rotated to a position whereby cam lobe 244 physically engages cam detector 246, a switch is closed and a signal is generated indicating that the tubular spray element 224 is at a predetermined rotational position. In the illustrated embodiment, for example, cam detector 246 is positioned at a top vertical position such that cam detector 246 generates a signal when nozzles 226 are directed straight upwards.

To simplify the discussion, it may be assumed that gears 236, 238 are identically configured such that tubular spray element 224 rotates a full revolution in response to rotation of drive shaft 234 by a full revolution, whereby the rotational position of tubular spray element 224 is derivable directly from the rotational position of drive shaft 234. In other embodiments, however, gears 236, 238 may be differently configured such that a full rotation of drive shaft 234 rotates tubular spray element by less than or more than a full revolution.

It will be appreciated that a cam detector in other embodiments may utilize other sensing technologies. For example, a cam detector may be implemented as a hall or magnetic sensor, and cam lobes on a cam may be implemented using magnets that are sensed by the hall or magnetic sensor when adjacent thereto. As another alternative, a cam detector may include one or more electrical contacts that close an electrical circuit when a cam lobe formed of metal or another electrical conductor engages the cam detector, or may include optical components that sense light or the blockage of light from different holes or durations.

Moreover, while position sensing is performed using a cam coupled to a drive shaft in the embodiment of FIG. 7 (such that the cam lobe(s) thereof rotate about an axis of rotation that is both coincident with the drive shaft and parallel to and offset from the longitudinal axis of the tubular spray element), in other embodiments, position sensing may be performed directly on tubular spray element 224 or a component that rotates therewith. FIG. 8, for example, illustrates an end view of a tubular spray element 250 including an integrated cam 252 including a single cam lobe 254, whereby cam lobe 254 rotates about an axis of rotation that is coincident with the longitudinal axis of tubular spray element 250.

FIG. 8 also illustrates another variation whereby multiple cam detectors, here cam detectors 256*a* and 256*b*, may be disposed around the perimeter of cam 252 to sense multiple rotational positions. Cam detectors may be placed at a multitude of rotational positions and for a multitude of purposes, e.g., to detect a "home" position, to detect rotational position corresponding to an "off" position for the tubular spray element (e.g., where an associated valve for the tubular spray element that is actuated through rotation of the tubular spray element is rotated to an off or closed position), to detect a deflector alignment position, to detect a "limit" position corresponding to a range limit (e.g., when it is desirable to define ranges where a tubular spray element should not be pointed, such as a wall of the wash tub), or to detect various "zones" in a dishwasher rack where it may be desirable to focus washing.

It will also be appreciated that a cam-based position sensor may include multiple cam lobes used with one or more cam detectors, and that these multiple cam lobes may rotate about a common axis and within a common plane (as is illustrated in FIG. 9), or alternatively, about a common axis and within different planes (as is illustrated in phantom in FIG. 7).

FIG. 9, for example, illustrates another variation whereby multiple cam lobes are disposed on a cam, and one or more cam detectors are used to sense the multiple cam lobes. In this implementation, a tubular spray element 260 includes a cam 262 integrated therewith and including multiple cam lobes 264*a*, 264*b* defined at different rotational positions. Moreover, while a single cam detector may be used in some embodiments, in the illustrated embodiment four cam detectors 266*a*, 266*b*, 266*c* and 266*d* are disposed at ninety degree increments around cam 262. It will be appreciated that in this implementation, four separate positions may be distinguished from one another based upon the combination of inputs from cam detectors 266a-d, since each ninety degrees of rotation will engage a different pair of cam detectors. Other numbers and positions of cam detectors and cam lobes may be used in other embodiments, so the invention is not limited to the particular implementations illustrated herein.

Returning to FIG. 7, it will also be appreciated that multiple cams may also be used in some embodiments, For example, a second cam 242' having a second cam lobe 244' and sensed by a second cam detector 246' are shown in phantom to support an ability to sense additional rotational positions. Second cam 242' rotates in a separate plane from cam 242, and thus a "stack" of two or more coaxial cams may be used in some embodiments to provide greater flexibility in terms of position sensing, particularly where discrimination between multiple distinct positions is desired.

Figure 10:
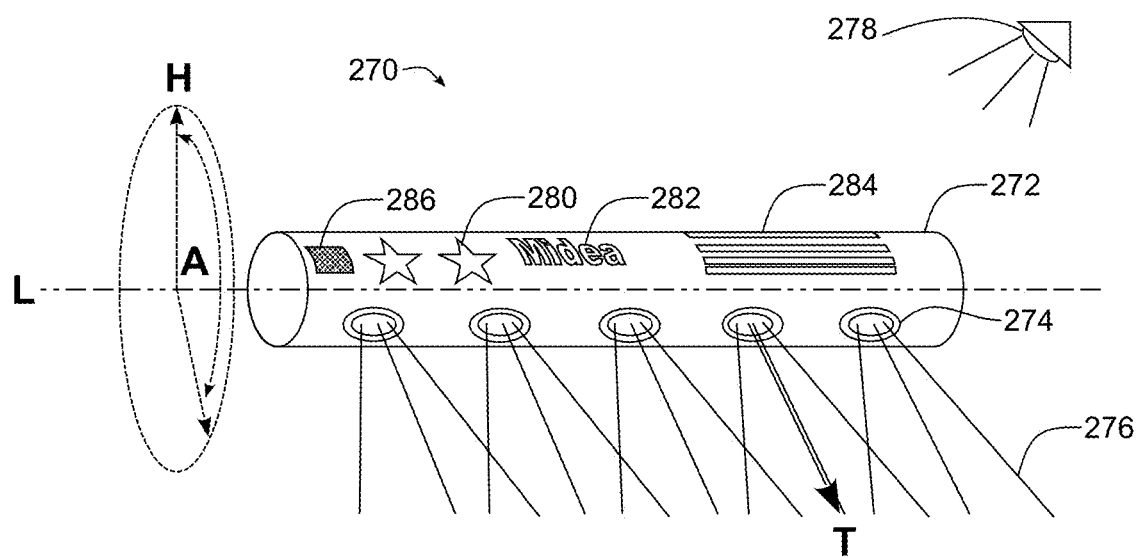
FIG. 10 is a functional perspective view of a tubular spray element and imaging system incorporating an image-based position sensor consistent with the invention.
Figure 11:
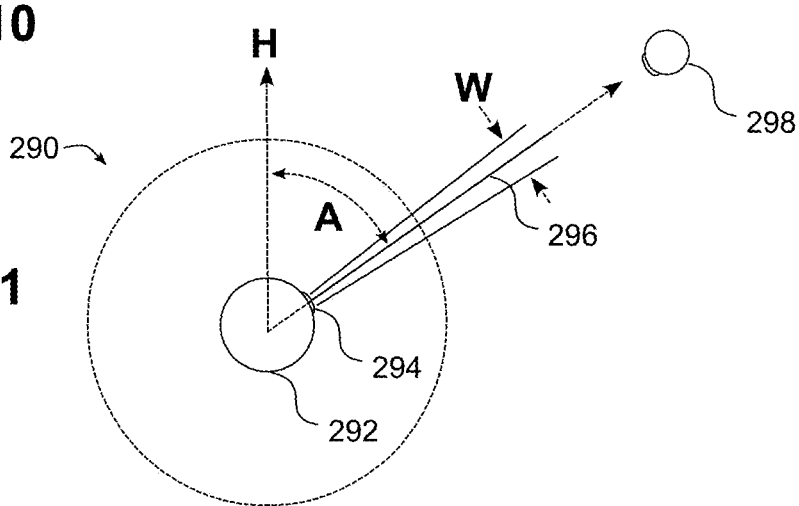
FIG. 11 is a functional end view of an alternative image-based position sensor to that illustrated in FIG. 10.
Figure 12:
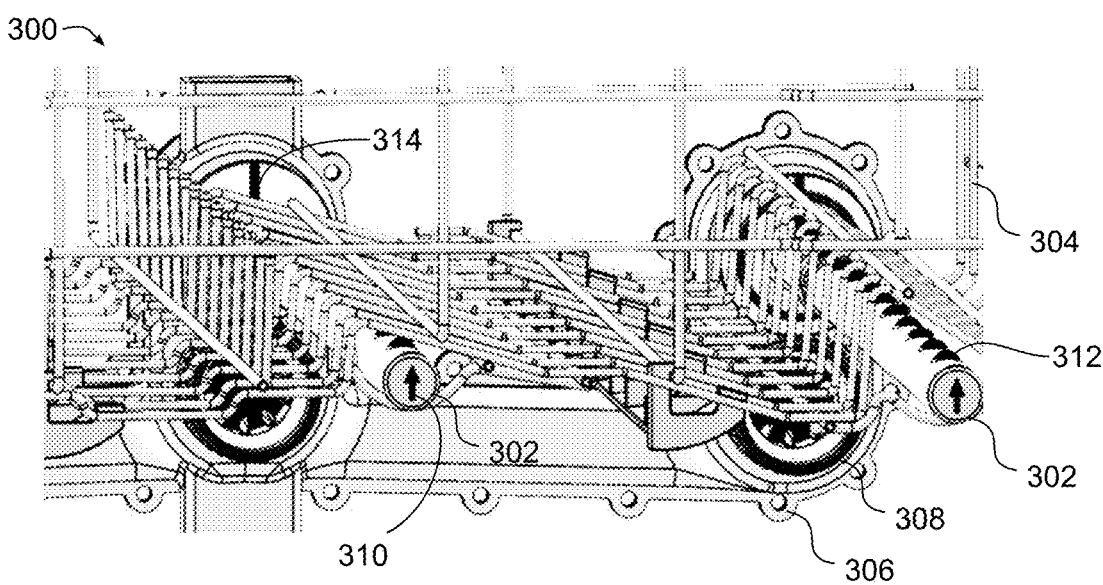
FIG. 12 is a perspective view of a dishwasher including a rack and a plurality of rack-mounted tubular spray elements incorporating distinctive features for use in image-based position sensing consistent with the invention.

Now turning to FIGS. 10-12, as an alternative to cam-based position sensing, image-based position sensing may be used in some embodiments of the invention, e.g., utilizing any of the various imaging system implementations described above. It will be appreciated, for example, that imaging systems may be utilized in dishwashers for other purposes, and as such, utilizing these imaging systems additionally to sense the rotational positions of tubular spray elements and/or other controllable sprayers in a dishwasher may be beneficial in some embodiments as doing so may reduce the number of sensors used to control tubular spray elements, lower costs and/or simplify a tubular spray element drive design.

FIG. 10, for example, illustrates an example dishwasher 270 including a tubular spray element 272 including a plurality of nozzles 274 that emit a spray pattern 276 generally along a trajectory T. A camera 278 or other imaging device may be positioned with tubular spray element 272 within its field of view to capture images of the tubular spray element during use. In some embodiments, multiple cameras 278 may be used to capture the tubular spray element from multiple viewpoints, while in other embodiments a single camera may be used.

A rotational position of tubular spray element 272 may be defined about its longitudinal axis L, and in some embodiments may be represented using an angle A relative to some home position H (e.g., a top vertical position in the illustrated embodiment, although the invention is not so limited).

The rotational position of tubular spray element 272 may be detected from image data based upon image analysis of one or more images captured from one or more image devices, and in many embodiments, may be based upon detecting one or more visually distinctive features that may be used to determine the current orientation of the tubular spray element about its longitudinal axis L. In some embodiments, for example, distinctive structures defined on the generally cylindrical surface of tubular spray element 272, e.g., nozzles 274, may be detected in order to determine the rotational position.

In other embodiments, however, distinctive indicia 280 that are incorporated into tubular spray element 272 solely or at least partially for purposes of image-based position sensing may be disposed at various rotational positions on the outer surface of tubular spray element 272. In addition, in some instances, as illustrated at 282, the distinctive indicia may be textual in nature. Furthermore, as illustrated at 284, the distinctive indicia may be designed to represent a range of rotational positions, such that image analysis of the indicia may be used to determine a specific rotational position within the range. Indicia 284, for example, includes a series of parallel bars that vary in width and/or spacing such that a location within the series of parallel bars that is visible in a portion of an image can be used to determine a particular rotational position, similar in many respects to the manner that a bar code may be used to retrieve numerical information irrespective of the orientation and/or size of the bar code in an image. Other indicia arrangements that facilitate discrimination of a rotational position out of a range of rotational positions may also be used in some embodiments, e.g., combinations of letters or numbers. In some embodiments, for example, an array of numbers, letters or other distinctive features may circumscribe the generally cylindrical surface of a tubular spray element such that a rotational position may be determined based upon the relative position of one or more elements in the array.

The indicia may be formed in varying manners in different embodiments, e.g., formed as recessed or raised features on a molded tubular spray element, formed using contrasting colors or patterns, integrally molded with the surface of the tubular spray element, applied or otherwise mounted to the surface of the tubular spray element using a different material (e.g., a label or sticker), or in other suitable manners. For example, a reflective window 286 may be used in some embodiments to reflect light within the washtub and thereby provide a high contrast feature for detection. Further, in some embodiments an indicia may itself generate light, e.g., using an LED. It will be appreciated that in some instances, fluid flow, detergent, and/or obstructions created by racks and/or utensils may complicate image-based position sensing, so high contrast indicia may be desirable in some instances to accommodate such challenging conditions.

With reference to FIG. 11, it will also be appreciated that image-based position sensing may also be based on sensing the actual fluid flow or spray pattern of fluid emitted by a tubular spray element. FIG. 11, in particular, illustrates a dishwasher 290 including a tubular spray element 292 with nozzles 294 that emit a spray pattern 296. Through appropriate positioning of a camera, an angle A relative to a home position H, and in some instances, a spray pattern width W, may be sensed via image-based position sensing. While a camera positioned to view generally along the longitudinal axis of the tubular spray element has a field of view well suited for this purpose, it will be appreciated that other camera positions may also be used.

In addition, in some embodiments, image-based position sensing may also be based upon the relationship of a spray pattern to a target, e.g., the example target 298 illustrated in FIG. 11, which may be, for example, disposed on a rack, on a tub wall, or another structure inside a dishwasher and having one or more visually-identifiable indicia disposed thereon. As will become more apparent below, in some embodiments it may be desirable to utilize a target in order to calibrate a tubular spray element drive, e.g., by driving the tubular spray element 292 to an expected position at which the spray pattern 296 will hit the target 298, determining via image analysis whether the spray pattern 296 is indeed hitting the target, and if not, adjusting the position of the tubular spray element to hit the target and updating the tubular spray element drive control accordingly.

Now turning to FIG. 12, it will also be appreciated that indicia may also be positioned on other surfaces of a tubular spray element and/or on other components that move with the tubular spray elements. FIG. 12 in particular illustrates a dishwasher 300 including multiple tubular spray elements 302 supported by a rack 304 and engaged with a docking arrangement 306 disposed on a back wall of the dishwasher tub, and including one or more rotatable docking ports 308.

In this embodiment, an indicia, e.g., an arrow 310, may be disposed on an end surface of a tubular spray element 302, and may be oriented such that the arrow tip may be aligned with the nozzles 312 of the tubular spray element (or any other rotational position of the tubular spray element), such that image analysis of the arrow indicia may be used to determine a rotational position of the tubular spray element. It will also be appreciated that other indicia that present visually distinct orientations throughout the rotation of the tubular spray element may be used as an alternative to an arrow indicia.

In addition, nozzles 312 are illustrated in a contrasting color that may also be used to determine the rotational position. Furthermore, each tubular spray element 302 is illustrated with an indicia (a contrasting line) 314 disposed on a docking component of the tubular spray element, which may also be used in image-based position sensing in some embodiments. Other components, e.g., gears, or rotatable components of a docking arrangement, may also include distinct indicia to facilitate position sensing in other embodiments. Furthermore, multiple colors may be used at different locations about the circumference of a tubular spray element to facilitate sensing in some embodiments.

Figure 13:
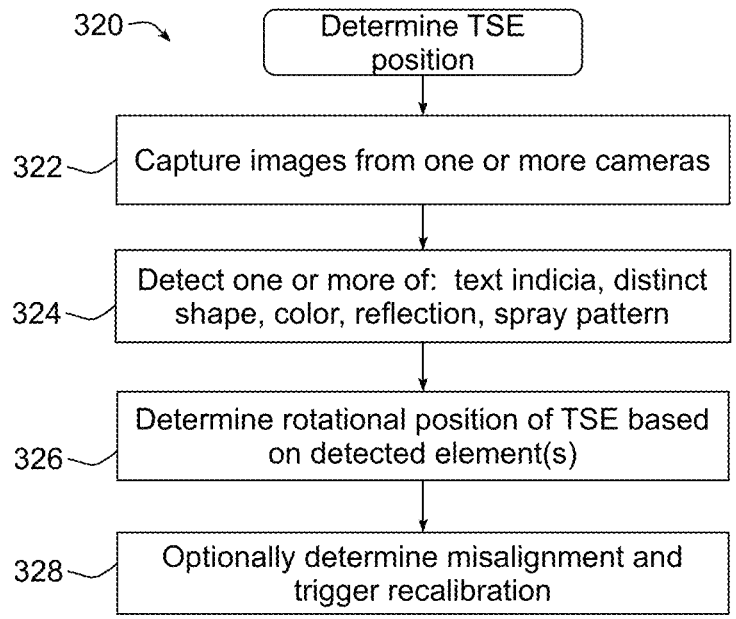
FIG. 13 is a flowchart illustrating an example sequence of operations for determining a rotational position of a tubular spray element during a wash cycle using an image-based position sensor consistent with the invention.

An example process for performing image-based position sensing consistent with the invention is illustrated at 320 in FIG. 13. In order to determine rotational position, one or more images may be captured from one or more cameras having fields of view that encompass at least a portion of the tubular spray element in block 322, and any of the aforementioned types of visually distinctive features (indicia, shapes, text, colors, reflections, spray patterns) may be detected in the image(s) in block 324. The rotational position is then determined in block 326 based upon the detected elements.

It will be appreciated that a rotational position may be determined from the detected elements in a number of manners consistent with the invention. For example, various image filtering, processing, and analysis techniques may be used in some embodiments. Further, machine learning models may be constructed and trained to identify the rotational position of a tubular spray element based upon captured image data. A machine learning model may be used, for example, to determine the position of a visually distinctive feature in block 324, to determine the rotational position given the position of a visually distinctive feature in block 326, or to perform both operations to effectively output a rotational position based upon input image data.

In addition, in some embodiments, it may be desirable to monitor for misalignments of a tubular spray element to trigger a recalibration operation. In block 328, for example, if it is known that the position to which the tubular spray element is being driven differs from the sensed position, a recalibration operation may be signaled such that, during an idle time (either during or after a wash cycle) the tubular spray element is recalibrated. In some embodiments, for example, image analysis may be performed to detect when a spray pattern is not hitting an intended target when the tubular spray element is driven to a position where it is expected that the target will be hit. In some embodiments, such analysis may also be used to detect when the spray pattern has deviated from a desired pattern, and recalibration of a flow rate may also be desired (discussed in greater detail below).

Figure 14:
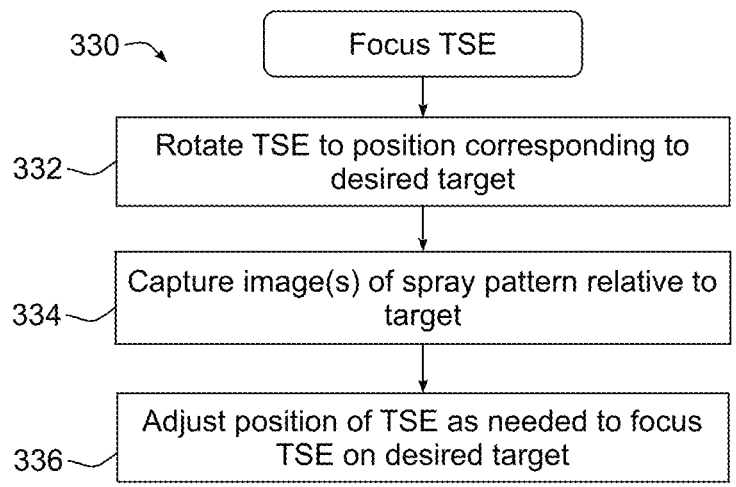
FIG. 14 is a flowchart illustrating an example sequence of operations for focusing a tubular spray element consistent with the invention.

Now turning to FIG. 14, it may also be desirable to use image-based position sensing to direct a tubular spray element to direct spray on a particular target, whereby a positional relationship between a spray pattern and a target may be used to control the rotational position of a tubular spray element. For example, as illustrated by process 330, a tubular spray element may be focused on a particular target by, in block 332, first rotating the tubular spray element to a position corresponding to a desired target, e.g., using process 320 to monitor TSE position until a desired position is reached. The target may be a particular component in the dishwasher, or a particular utensil in the dishwasher, or even a particular location on a component or utensil in the dishwasher (e.g., a particular spot of soil on a utensil). The target location may be determined, for example, based upon image analysis of one or more images captured in the dishwasher (from which, for example, a desired angle of spray is determined from the previously known position of a tubular spray element), or based upon a previously-known rotational position corresponding to a particular target (e.g., where it is known that the silverware basket is between 120 and 135 degrees from the home position of a particular tubular spray element).

Next, once the tubular spray element is rotated to the desired position, one or more images are captured in block 334 while a spray pattern is directed on the target, and image analysis is performed to determine whether the spray pattern is hitting the desired target. If so, no adjustment is needed. If not, however, block 336 may adjust the position of the tubular spray element as needed to focus the tubular spray element on the desired target, which may include continuing to capture and analyze images as the tubular spray element is adjusted.

While image-based position sensing may be used in some embodiments to detect a current position of a tubular spray element in all orientations, in other embodiments it may be desirable to use image-based position sensing to detect only a subset of possible rotational positions, e.g., as little as a single "home" position. Likewise, as noted above, cam-based position sensing generally is used to detect only a subset of possible rotational positions of a tubular spray element. In such instances, it may therefore be desirable to utilize a time-based control where, given a known rate of rotation for a tubular spray element, a tubular spray element drive may drive a tubular spray element to different rotational positions by operating the tubular spray element drive for a predetermined amount of time associated with those positions (e.g., with a rate of 20 degrees of rotation per second, rotation from a home position at 0 degrees to a position 60 degrees offset from the home position would require activation of the drive for 3 seconds). Given a rotation rate of a tubular spray element drive (e.g., in terms of Y degrees per second) and a desired rotational displacement X from a known rotational position sensed by a position sensor, the time T to drive the tubular spray element drive after sensing a known rotational position is generally T=X/Y.

Figure 15:
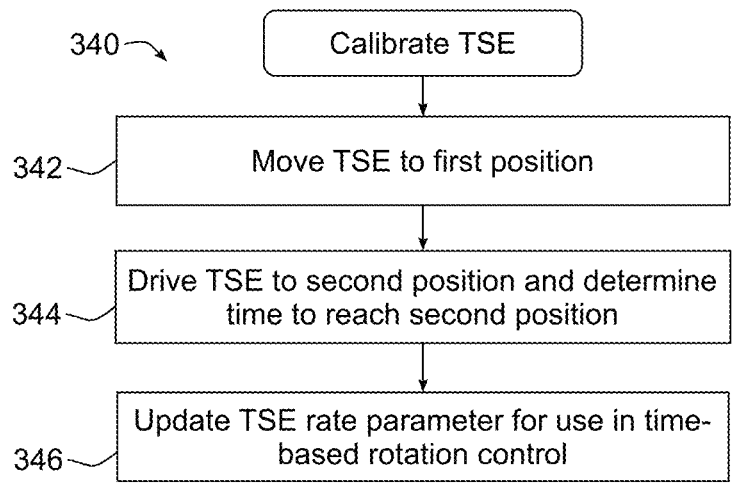
FIG. 15 is a flowchart illustrating an example sequence of operations for calibrating a tubular spray element consistent with the invention.

In order to determine the rotation rate of a tubular spray element, a calibration process, e.g., as illustrated at 340 in FIG. 15, may be used. It will be appreciated that calibration may be performed during idle times or during various points in a wash cycle, and may be performed in some instances while fluid is being expelled by a tubular spray element, or in other instances while no flow of fluid is provided to the tubular spray element. In addition, in some embodiments, different tubular spray elements may be calibrated at different times, while in other embodiments calibration may be performed concurrently for multiple tubular spray elements. It will also be appreciated that, in some instances, wear over time may cause variances in the rate of rotation of a tubular spray element in response to a given control input to a tubular spray element drive, and as such, it may be desirable to periodically perform process 340 over the life of a dishwasher to update the rotation rate associated with a tubular spray element.

In process 340, a tubular spray element is driven to a first position (e.g., a home position as sensed by an image-based position sensor or corresponding to a particular cam detector/cam lobe combination of a cam-based position sensor) in block 342, and then is driven to a second position in block 344, with the time to reach the second position determined, e.g., based upon a timer started when movement to the second position is initiated. The second position may be at a known rotational position relative to the first position, such that the actual rotational offset between the two positions may be used to derive a rate by dividing the rotational offset by the time to rotate from the first to the second position. The rate may then be updated in block 346 for use in subsequent time-based rotation control.

In some embodiments, the first and second positions may be separated by a portion of a revolution, while in some embodiments, the first and second positions may both be the same rotational position (e.g., a home position), such that the rotational offset corresponds to a full rotation of the tubular spray element. In addition, multiple iterations may be performed in some embodiments with the times to perform the various iterations averaged to generate the updated rate.

Figure 16:
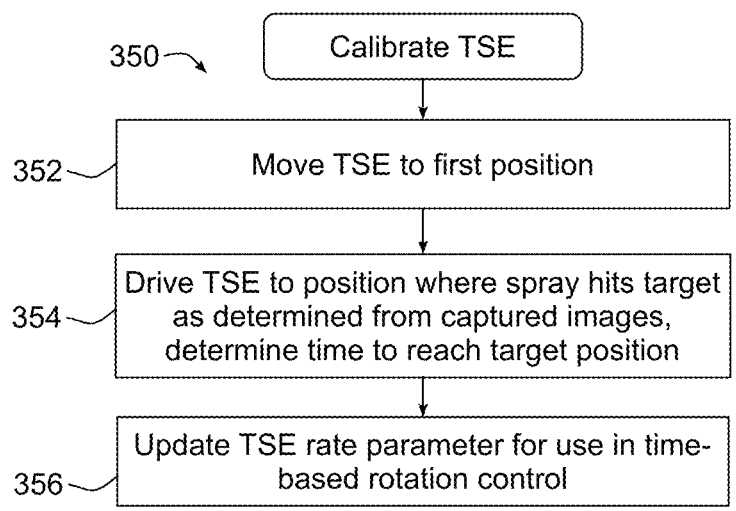
FIG. 16 is a flowchart illustrating another example sequence of operations for calibrating a tubular spray element.

As an alternative to process 340, calibration of a tubular spray element may be based upon hitting a target, as illustrated by process 350 of FIG. 16. In this process, the tubular spray element is driven to a known first position, e.g., a home position, in block 352. Then, in block 354, the tubular spray element is driven while wash fluid is expelled by the tubular spray element until the spray pattern is detected hitting a particular target, e.g., similar to the manner discussed above in connection with FIG. 14. During this time, the amount of time required to rotate from the first position to the target position is tracked, and further based upon the known rotational offset of the target position from the first position, an updated rate parameter may be generated in block 356 for use in subsequent time-based rotation control.

Figure 17:
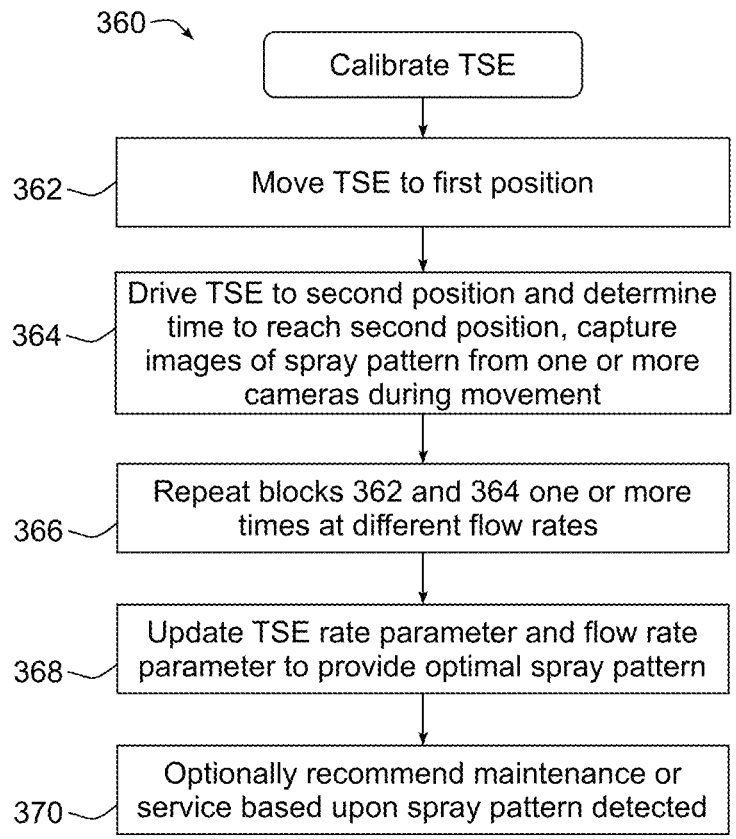
FIG. 17 is a flowchart illustrating yet another example sequence of operations for calibrating a tubular spray element, and incorporating image-based spray pattern analysis consistent with the invention.

FIG. 17 illustrates another example calibration process 360 suitable for use in some embodiments. Process 360, in addition to determining a rate of rotation, also may be used to assess a spray pattern of a tubular spray element and generate a flow rate parameter that may be used to control a variable valve that regulates flow through the tubular spray element, or alternatively control a flow rate for a fluid supply that supplies fluid to the tubular spray element. In particular, it will be appreciated that since solids build up over time with wash cycles (e.g., due to hard water and soils), it may be desirable to include a calibration mode where a dishwasher runs through a series of operations while visually detecting the rotational positions of the tubular spray elements. This collected information can serve a purpose of determining any degradation of rotational speed and/or change in exit pressure of wash liquid from the tubular spray elements over time. The calibration may then be used to cause a modification in rotational speed and/or exit pressure of water (e.g., via changes in flow rate) from the tubular spray elements in order to optimize a wash cycle.

Process 360 begins in block 362 by moving the tubular spray element to a first position. Block 364 then drives the tubular spray element to a second position and determines the time to reach the second position. In addition, during this time images are captured of the spray pattern generated by the tubular spray element. Next, in block 366, blocks 362 and 364 are repeated multiple times, with different flow rates supplied to the tubular spray element such that the spray patterns generated thereby may be captured for analysis. Block 368 then determines a rate parameter in the manner described above (optionally averaging together the rates from the multiple sweeps).

In addition, block 368 may select a flow rate parameter that provides a desired spray pattern. In some embodiments, for example, the spray patterns generated by different flow rates may be captured in different images collected during different sweeps, and the spray patterns may be compared against a desired spray pattern, with the spray pattern most closely matching the desired spray pattern being used to select the flow rate that generated the most closely matching spray pattern selected as the flow rate to be used. In addition, analysis of spray patterns may also be used to control rate of rotation, as it may be desirable in some embodiments to rotate tubular spray elements at slower speeds to increase the volume of fluid directed onto utensils and thereby compensate for reduced fluid flow. Further, in some embodiments, pressure strength may be measured through captured images. As one example, a tubular spray element may be rotated to an upwardly-facing direction and the height of the spray pattern generated may be sensed via captured images and used to determine a relative pressure strength of the tubular spray element.

In addition, as illustrated in block 370, it may be desired in some embodiments to optionally recommend maintenance or service based upon the detected spray patterns. For example, if no desirable spray patterns are detected, e.g., due to some nozzles being partially or fully blocked, it may be desirable to notify a customer of the condition, enabling the customer to either clean the nozzles, run a cleaning cycle with an appropriate cleaning solution to clean the nozzles, or schedule a service. The notification may be on a display of the dishwasher, on an app on the user's mobile device, via text or email, or in other suitable manners.

Figure 18:
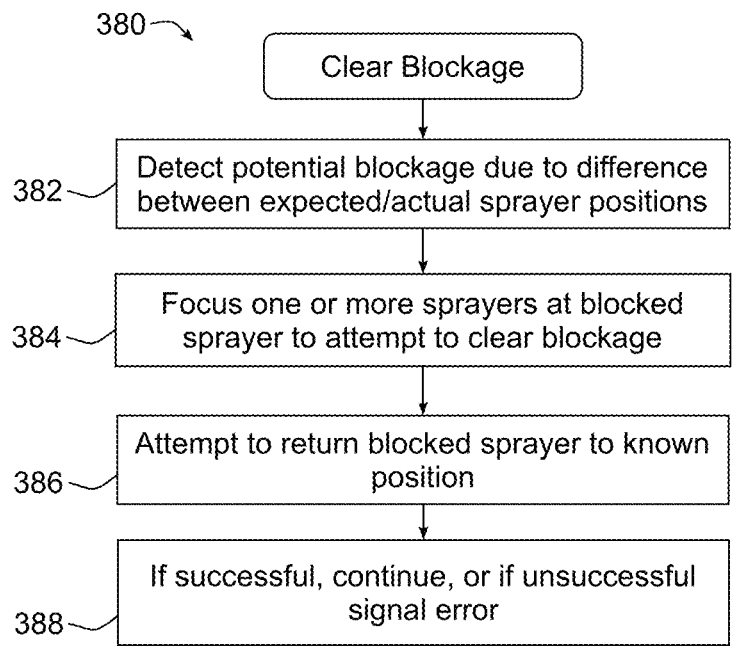
FIG. 18 is a flowchart illustrating an example sequence of operations for clearing a blockage in a sprayer consistent with the invention.

Now turning to FIG. 18, it may also be desirable in some embodiments to utilize position sensing to clear potential blockages in a tubular spray element. In a process 380, for example, a difference between sensed and expected rotational positions of a tubular spray element (or potentially of another type of controlled sprayer) may be detected in block 382, and may cause one or more tubular spray elements or other controlled sprayers to be focused on the blocked sprayers to attempt to clear the blockage. For example, if the gears or other drivetrain components for a controlled sprayer become blocked by food particles, other sprayers may be focused on the sprayer to attempt to clear the blockage.

After focusing spray on the blocked sprayer, block 386 may then attempt to return the blocked sprayer to a known position, and then monitor the position in any of the manners described above. Then, in block 388, if the movement is successful, the wash cycle may resume in a normal manner, and if not, an error may be signaled to the user, e.g., in any various manners mentioned above, for maintenance or service.

Fluid Condition Sensing

In some embodiments of the invention, it may also be desirable to utilize an imaging system to perform turbidity or other fluid condition sensing. The imaging system may include one or more cameras or other imaging devices disposed outside of a sump of a dishwasher, and in many instances above the sump as well as a maximum fluid level for the sump, but having a field of view directed towards the sump to sense the turbidity or condition of fluid disposed in the sump. In addition, in some embodiments, a light may be projected through the fluid in the sump to facilitate turbidity or fluid condition sensing by an imaging device. The light may be disposed within the sump or alternatively, may be disposed outside of the sump, with a mirror or other reflective element disposed in the sump and configured to reflect the light towards the camera or imaging device.

By positioning an imaging device utilized for fluid condition sensing outside of the sump, the imaging device may be utilized for one or more non-fluid condition sensing operations in a dishwasher in some embodiments, e.g., load sensing, object sensing, soil sensing, remote viewing, detergent sensing, filter sensing, filter cleaning, fluid level sensing, sprayer position sensing, self-cleaning, diagnostics or for other operations as will be appreciated by those of ordinary skill having the benefit of the instant disclosure. Moreover, in various embodiments, an imaging device utilized for fluid condition sensing may be disposed in a fixed location in a dishwasher (e.g., a tub wall) and have a fixed field of view, or alternatively may be movable and/or may have a controllably-varied field of view to enable the imaging device to be focused on a particular target (e.g., a light or reflective element in the sump) for the purpose of fluid condition sensing. Further, when utilized for multiple imaging purposes, in some embodiments an imaging device used for fluid condition sensing may be disposed within a sump but also capable of capturing images of other areas of the dishwasher that are external from the sump.

In addition, it will be appreciated that an imaging device utilized for fluid condition sensing may sense visible light or other spectra, e.g., the infrared spectrum. In addition, any supplemental illumination provided for fluid condition sensing may be visible (white) light or may be limited to various spectra, e.g., an infrared light, a red light, a green light, or other suitable spectrum for sensing turbidity or other fluid conditions. Further, while the illustrated embodiments utilize a single imaging device, other embodiments may utilize multiple imaging devices for fluid condition sensing.

Figure 19:
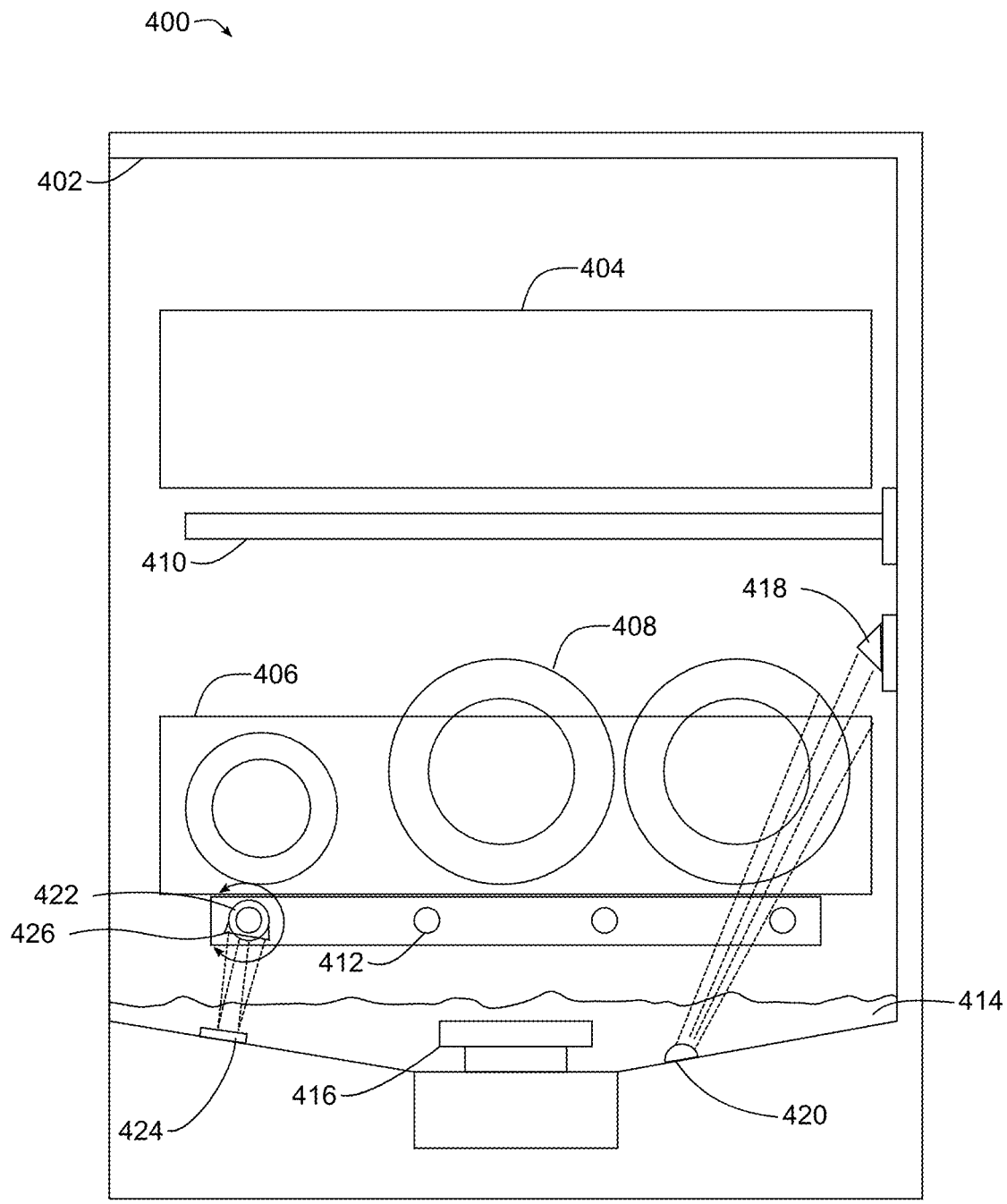
FIG. 19 is a side cross-sectional view of a dishwasher including fluid condition sensing consistent with some embodiments of the invention.

Now turning to FIG. 19, this figure illustrates a dishwasher 400 including a wash tub 402 and upper and lower racks 404, 406 for holding one or more utensils 408. In this embodiment, arrays of wall-mounted tubular spray elements 410, 412 are disposed below each of racks 404, 406, with tubular spray elements 410 mounted to a rear wall of wash tub 402 and tubular spray elements 412 mounted to a side wall of wash tub 402 such that tubular spray elements 412 extend generally transversely to tubular spray elements 410. In other embodiments, tubular spray elements 410 and/or 412 may be rack-mounted, and in other embodiments other positions, numbers, and arrangements of tubular spray elements may be used. Further, in other embodiments, other sprayers may be used in addition to or in lieu of tubular spray elements, so the invention is not limited to fluid condition sensing in connection with tubular spray elements.

Dishwasher 400 also includes a sump 414, which may be considered to be a lower portion of wash tub 402 within which water, wash fluid, etc., is collected for recirculation and/or drainage during a wash cycle. A filter 416 may be disposed within sump 414, and it will be appreciated that during a wash cycle fluids are generally introduced into sump 414 by an inlet valve coupled to a water supply and then distributed through tubular spray elements 410, 412 (or other sprayers) by a pump (not shown in FIG. 19) and collected by the sump 414, until such time as it is desirable to flush the fluid, whereby the fluid is drained from the sump by either the pump that performed the recirculation or a different pump. In addition, a sump in some embodiments may include heating elements used to heat the fluid in the sump. It will be appreciated that a wide variety of sizes, shapes, and designs of sumps may be utilized in various embodiments, so the invention is not limited to the particular sump design illustrated in FIG. 19.

Dishwasher 400 also includes an imaging system including one or more imaging devices, e.g., imaging device 418 mounted in a fixed location and with a fixed field of view on the rear wall of wash tub 402, and capable of functioning as a fluid condition sensor. The field of view of imaging device 418 includes at least an unobstructed portion of sump 414, and in some embodiments, may include a portion of sump 414 that includes a light or other illumination source 420 that emits a light that is sensed by imaging device 418. Turbidity or other conditions in the fluid between illumination source 420 and imaging device 418 may in some embodiments be based on the attenuation of the illumination source 420 by the fluid, as the cloudier the fluid, the less light is received by imaging device 418. In some embodiments, no dedicated illumination source may be used, and in some embodiments, ambient illumination, e.g., from the top wall of the dishwasher, may be used to provide illumination in some embodiments.

As noted above, while in some embodiments imaging device 418 may be dedicated to fluid condition sensing, in other embodiments imaging device 418 may also be used for other purposes, e.g., to image lower rack 406 for load, object or soil sensing, to image a tubular spray element 412 for position sensing, to image filter 416 for diagnostics reasons, or for other suitable purposes.

In addition, as noted above, rather than utilizing a fixed imaging device, in other embodiments an imaging device having a controllably-variable field of view may be used, e.g., as illustrated by imaging device 422 disposed on one of tubular spray elements 412. When fluid condition sensing is desired, imaging device 422 may be moved to a position where the field of view thereof includes a target (e.g., an illumination source or reflective element) in the sump; however, at other times imaging device 422 may be moved to other positions to capture images for other purposes.

In addition, as noted above, rather than utilizing a target that is a direct illumination source that emits light in a direct line-of-sight to an imaging device as is the case with illumination source 420, a reflective element, e.g., mirror 424, may be positioned within sump 414 and utilized to reflect light towards an imaging device such that turbidity or other fluid conditions are based on indirect illumination that is reflected by the reflective element rather than direct illumination by the illumination source. In the illustrated embodiment, for example, an illumination source 426 may be disposed proximate imaging device 422 (e.g., a ring of LEDs circumscribing the imaging device) such that light emitted thereby is reflected by mirror 424 back to imaging device 422. Other locations of an imaging device, reflective element and/or illumination source may be used in other embodiments. It will also be appreciated that while two methods of fluid condition sensing are illustrated in dishwasher 400 of FIG. 19, fluid condition sensing may be performed in some embodiments with a single imaging device, and optionally, a single illumination source and/or reflective element.

Regardless of whether indirect illumination, direct illumination, or ambient illumination is used, a fluid condition such as turbidity may be represented by a value determined by the controller of the dishwasher, or alternatively, by a remote device in communication with the dishwasher.

Where local fluid condition determinations are performed, for example, a controller may sense an intensity of light in the sump from the captured image(s) from one or more imaging devices, and in some instances, may focus on the intensity of light proximate a specific target, e.g., an illumination source or reflective element in the sump. As such, in some instances a bounding box may be used to extract from the captured image(s) only those pixels in the images that are proximate to the target, and pixel color data may be used to determine the relative intensity of light in the bounding box. Where remote fluid condition determinations are performed, the dishwasher controller may communicate captured images to a remote device such as a cloud service to perform the image analysis and return to the controller some value representative of turbidity or another fluid condition. It will be appreciated that in either case, a value representative of turbidity or another fluid condition may be based upon a light intensity level, a value defined in Nephelometric Turbidity Units (NTUs), Formazin Turbidity Units (FTUs), Formazin Nephelometric Units (FNUs) or other suitable units, in any dimensionless value that is relative to some baseline value associated with clean water, or in other suitable representations.

In addition, in some embodiments, a white balance level may also be used to determine an amount of obstruction and/or soil level. For example, white balance level may be combined with object detection in some embodiments to identify bubbles or suds on a water surface, such that even in low light, such objects may be detected and a dishwasher may take steps to reduce suds and re-evaluate.

Figure 20:
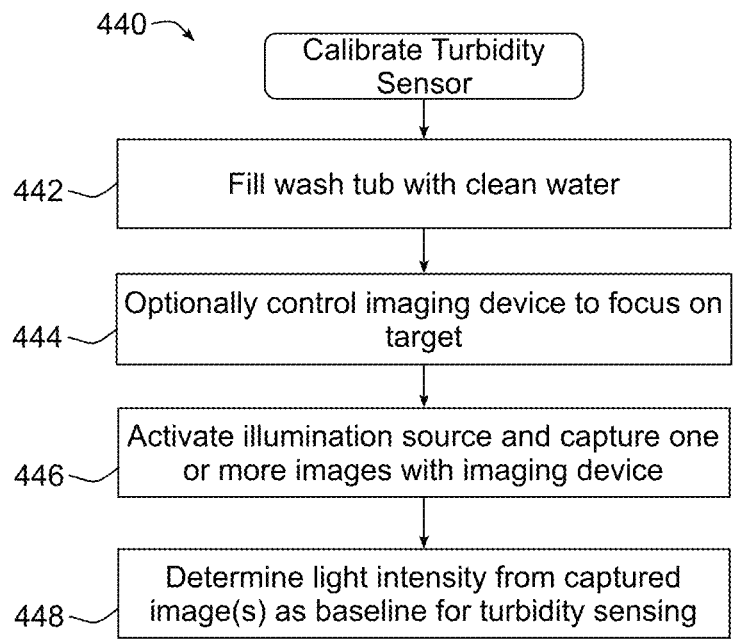
FIG. 20 is a flowchart illustrating an example sequence of operations for calibrating the fluid condition sensor of FIG. 19.

In some embodiments, condition sensing of a fluid in the sump may be based at least in part on the intensity of light transmitted through the fluid and detected by an imaging device, as the intensity will generally be attenuated based upon the cloudiness of the fluid. As such, it may be desirable in some embodiments to calibrate an imaging device to determine a baseline light intensity for clear water. FIG. 20, for example, illustrates a calibration process 440 suitable for determining a baseline light intensity in some embodiments. Process 440 begins in block 442 by filling the wash tub with clean water, e.g., to a predetermined amount that can be the same as or different from the volume of water added during various operations in a wash cycle.

Next, block 444 optionally controls the imaging device to be calibrated to focus the field of view on a desired target in the sump, e.g., an illumination source or reflective element, or some other structure in the sump that will be used for fluid condition sensing. For a fixed imaging device, block 444 may be omitted.

Next, in block 446, an illumination source (if used) is activated and one or more images are captured by the imaging device. Then, in block 448, a light intensity value is determined from the captured image(s) and stored for use as a baseline intensity value. The light intensity may be determined, for example, by creating a bounding box around the target in the captured images and assessing the imaging data captured within the bounding box.

Process 440 may be performed in some embodiments during manufacturing or post-manufacturing testing, or may be performed during a dedicated calibration operation for the dishwasher upon initial installation of the dishwasher. In other embodiments, however, it may be desirable to periodically perform the calibration process, e.g., to account for changes in the illumination source and/or imaging device over time. Such recalibration processes may be performed in dedicated calibration processes in some embodiments, while in other embodiments recalibration may be incorporated into a wash cycle, e.g., during or after a final rinse operation when there is relative assurance that the dishwasher and contents are clean and that water introduced into the wash tub will be in a clean state for calibration purposes.

Figure 21:
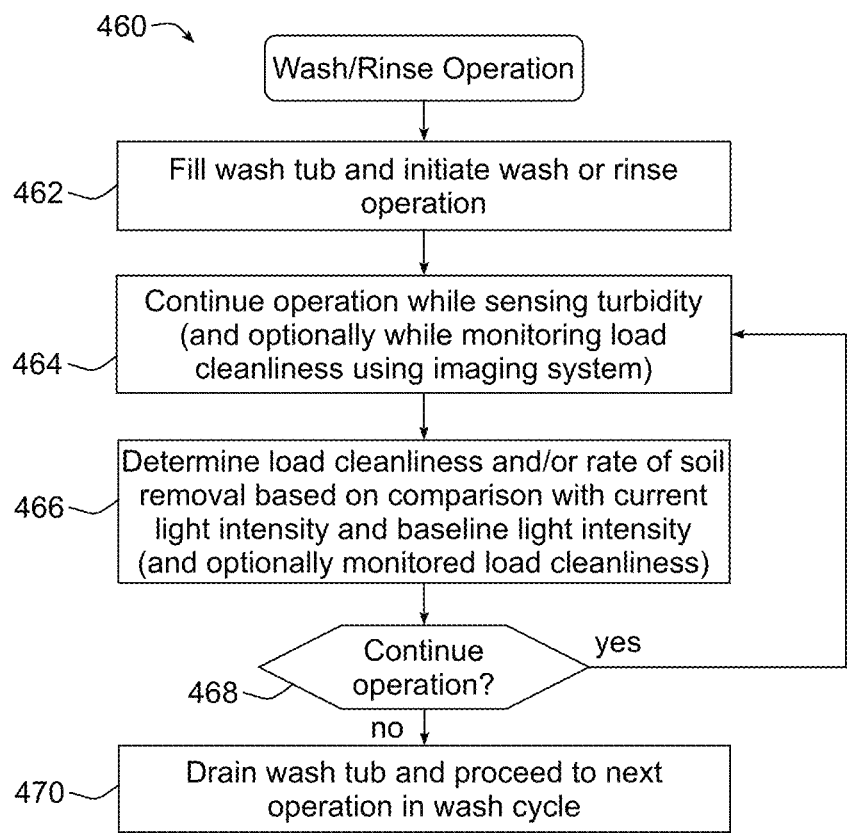
FIG. 21 is a flowchart illustrating an example sequence of operations for performing a wash or rinse operation using the fluid condition sensor of FIG. 19.

While turbidity and other fluid condition data collected from an imaging device may be used in various embodiments in a similar manner to data collected from other types of fluid condition sensors, in the illustrated embodiment, collected data may be used either alone or in combination with additional image data collected from a load to monitor cleanliness of a load during a wash cycle. FIG. 21, for example, illustrates an example process 460 used to perform a wash or rinse operation during a wash cycle. It will be appreciated that a wash cycle generally performs a sequence of operations, including, for example, fill operations, soak operations, wash operations, rinse operations, dry operations, rinse aid operations, etc., and process 460 may be used to determine when certain of these types of operations may be deemed to be complete, such that the wash cycle may proceed to a next operation. Process 460 focuses in particular on wash and rinse operations; however, in other embodiments, other operations where the turbidity or condition of the fluid in the sump may vary may be monitored in a similar manner.

Process 460 begins in block 462 by filling the wash tub and initiating the wash or rinse operation. Block 464 then continues the operation while sensing turbidity or another fluid condition at various points during the operation. It will be appreciated that if an imaging device used for fluid condition sensing has a controllably-variable field of view, the imaging device may be controlled to view the target used for fluid condition sensing whenever data collection is performed, and that if an illumination source is used for fluid condition sensing, that illumination source may also be activated whenever data collection is performed. In addition, as noted in block 464, optionally during the operation image data may also be collected of a load using the imaging device and/or other imaging devices such that the load itself may be analyzed for cleanliness (e.g., by monitoring soil on the utensils being cleaned). In other embodiments, however, no separate load monitoring may be performed.

Next, in block 466, the load cleanliness and/or a rate of soil removal may be calculated based upon a comparison of the currently-sensed light intensity in the turbidity or other fluid condition data with the baseline light intensity. In addition, where load monitoring is also performed, analysis of the load itself may also be performed at this time.

From the perspective of fluid condition sensing, a load cleanliness may be based upon the difference between the baseline light intensity and the currently-sensed light intensity, whereby completion of an operation may be determined based upon the currently-sensed light intensity being substantially equal to, or at least within some threshold from the baseline light intensity, which indicates that the fluid in the sump has a similar turbidity or other fluid condition to clean water. Also, a rate of soil removal from the perspective of fluid condition sensing may be based upon the rate of change of light intensity between different data. The rate of soil removal may be used, for example, to predict when to halt an operation, or whether or not to repeat another operation. For example, in some embodiments, the rate of soil removal may determine that the fluid in the sump has reached a steady state condition, so rather than continue with the current operation, the sump should be drained and refilled with clean water to continue with another wash or rinse operation.

Thus, based upon the load cleanliness and/or rate of soil removal, block 468 either returns control to block 464 to continue with the current operation, or passes control to block 470 to drain the wash tub and proceed to a next operation. Process 460 is then complete.

Fluid Level Sensing

Some embodiments consistent with the invention may also utilize an imaging system to sense a fluid level in a sump of a dishwasher, using one or more imaging devices having a field of view directed at the sump. Fluid level sensing may be used, for example, to determine a volume of fluid in the sump, to determine when to shut off a water inlet valve when filling the dishwasher, to determine a rate of filling, to determine a rate of draining, or to determine an amount of additional water to be added to the dishwasher, or for other purposes as will be appreciated by those of ordinary skill having the benefit of the instant disclosure. In addition, fluid level sensing may be used to trigger various maintenance operations in a dishwasher, e.g., to clean a filter or direct a spray of fluid at the filter during draining. Further, in some embodiments, fluid level sensing may be used to determine the level state of a dishwasher, and may be used during installation or thereafter to assist in leveling the dishwasher.

Figure 22:
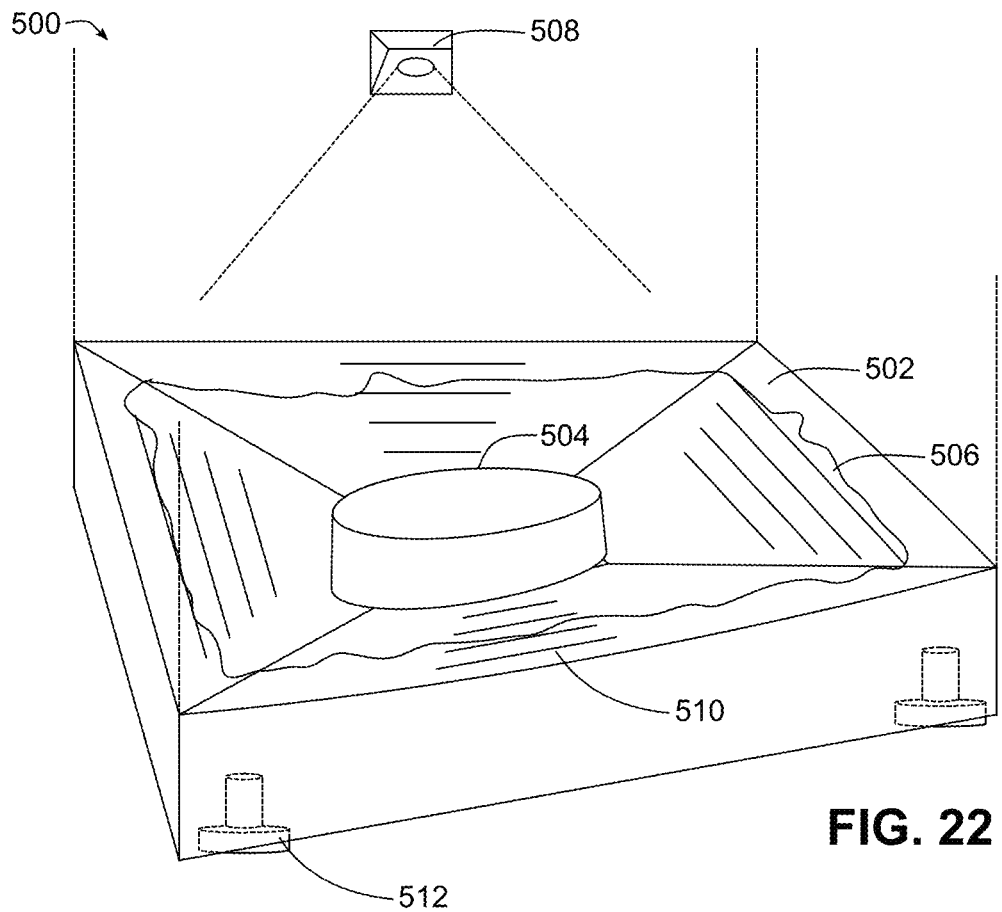
FIG. 22 is a perspective view of a sump region of a dishwasher including fluid level sensing consistent with some embodiments of the invention.
Figure 23:
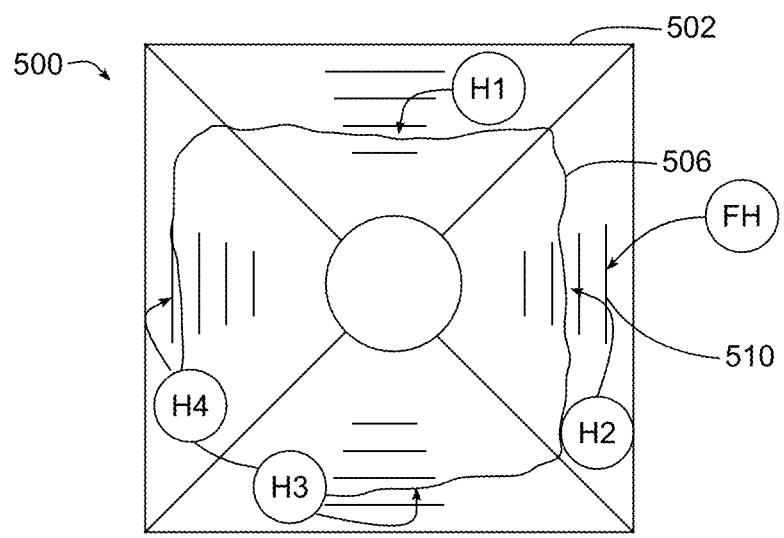
FIG. 23 is a top plan view of the sump region of the dishwasher of FIG. 22.

FIGS. 22 and 23, for example, illustrate a portion of a dishwasher 500 including a sump 502 and filter 504, and shown with a volume of fluid 506 disposed therein. An imaging device 508, e.g., a wall-mounted camera, is also illustrated having a field of view including the sump. In some embodiments, sump 502 may also include various visually distinct features 510 that are molded, printed or otherwise formed on sump at various levels to assist with determining a volume of fluid within the sump. Features 510 may also be formed of a different material from the sump, e.g., using reflective material, or in some instances, one or more illumination sources that emit light that is detectable by the imaging device. The features 510 may take any number of forms, including, for example, a series of parallel lines disposed at different depths in the sump as illustrated in FIGS. 22 and 23. The parallel lines may be evenly spaced in some embodiments, or may be unevenly spaced and/or have different lengths to facilitate discrimination between different lines. Other features, e.g., including alphanumeric information or other graphical designs, may be used in other embodiments.

In some embodiments, for example, features may be used to indicate a full height (FH) corresponding to a volume of fluid in the sump when the sump is considered full. The FH level may be used to determine when to shut off an inlet valve during a fill operation, to determine an overfull condition, or for other suitable uses.

In addition, while features may be disposed in a single area of the sump in some embodiments, in other embodiments, e.g., as illustrated in FIGS. 22 and 23, features may be disposed in multiple areas, and by doing so, may facilitate a determination of a level state of the dishwasher itself. FIG. 23, for example, illustrates a dishwasher in a non-level state, where it can be seen that a fluid level sensed at four positions H1, H2, H3 and H4 indicates that the dishwasher is tilted to the left and the bottom of the figure given the higher sensed levels H3 and H4 relative to levels H1 and H2. Detection of a non-level dishwasher may be used to assist with leveling the dishwasher, e.g., by adjusting adjustable legs 512 of the dishwasher as illustrated in FIG. 22.

While features 510 may be used in some embodiments, however, in other embodiments it may not be desirable to incorporate any features that are included only for the purposes of fluid level detection. Instead, the existing structure of the sump may provide various visually distinct features that are suitable for use in determining a fluid level. For example, in some embodiments the edges between the sump and the side walls of the wash tub may be used as visually distinct features. In other embodiments, a filter in the sump may be used as a visually distinct feature.

A determined fluid level may also be used in some embodiments to determine a fluid volume in the sump. Mapping between a fluid level and a fluid volume may be based upon empirical testing or modeling of a sump based upon the static nature of a sump geometry.

Determination of a fluid level via image analysis may be implemented in a number of manners consistent with the invention. For example, various image filtering, processing, and analysis techniques may be used in some embodiments, e.g., using trained machine learning models that output a fluid level or fluid volume in response to captured image data. In some embodiments utilizing the parallel lines illustrated in FIGS. 22 and 23, for example, a fluid level may be determined by counting the number of visible lines above a fluid surface, or where the lines are distinguishable by length and/or by spacing, by analyzing the length and or spacing between lines to identify which among the lines is closest to the fluid surface. Other manners of determining a fluid level via image analysis may be used in other embodiments as will be appreciated by those of ordinary skill having the benefit of the instant disclosure.

Figure 24:
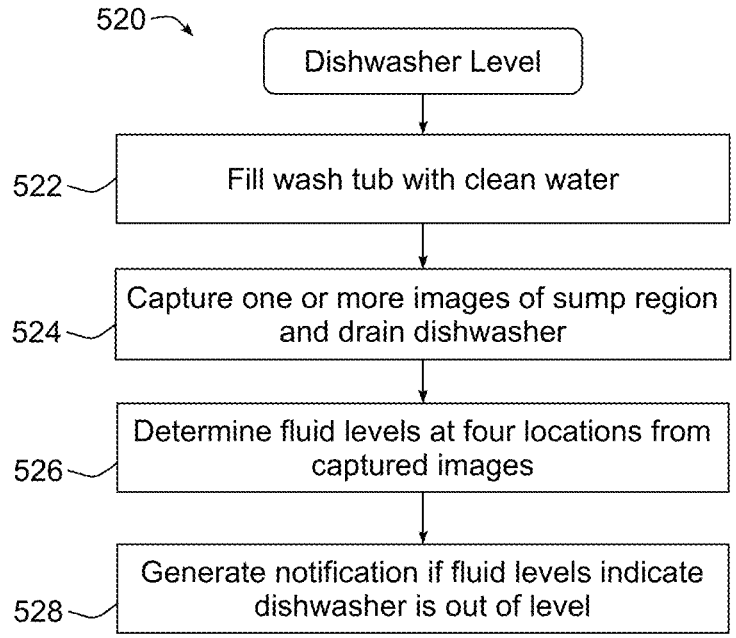
FIG. 24 is a flowchart illustrating an example sequence of operations for determining a dishwasher level using the fluid level sensor of FIG. 22.

Now turning to FIG. 24, this figure illustrates an example process 520 for determining a level state of a dishwasher in a manner consistent with the invention. Process 520 may be performed, for example, in response to user input directed to a user interface of the dishwasher or a mobile app in communication with the dishwasher, or may be performed periodically in some embodiments to periodically confirm the level status of the dishwasher. Process 520 begins in block 522 by filling the wash tub with clean water. Block 524 then captures one or more images of the sump region of the dishwasher using one or more imaging devices, and then drains the dishwasher. Block 526 next determines fluid levels at multiple (e.g., four) locations, e.g., the four sides or corners of the sump, from the captured image(s). The fluid level determinations may be made, for example, via image analysis performed locally in the controller, or in some instances, remotely via a cloud service, mobile app, etc. Block 528 then generates a notification if the fluid levels indicate that the dishwasher has an out of level condition, e.g., if one or more of the multiple fluid levels differ by more than a threshold. The notification may be via a user interface of the dishwasher, via a mobile app, via text message, via email, or in other manners as will be appreciated by those of ordinary skill having the benefit of the instant disclosure. The notification may indicate an out of level condition in some instances, while in other instances, the notification may additionally include the degree and/or direction of the out of level condition. In addition, in some embodiments, greater or fewer than four locations may be used to determine a level state of a dishwasher, e.g., as few as two locations (which may be used to sense front-to-back or left-to-right level).

Figure 25:
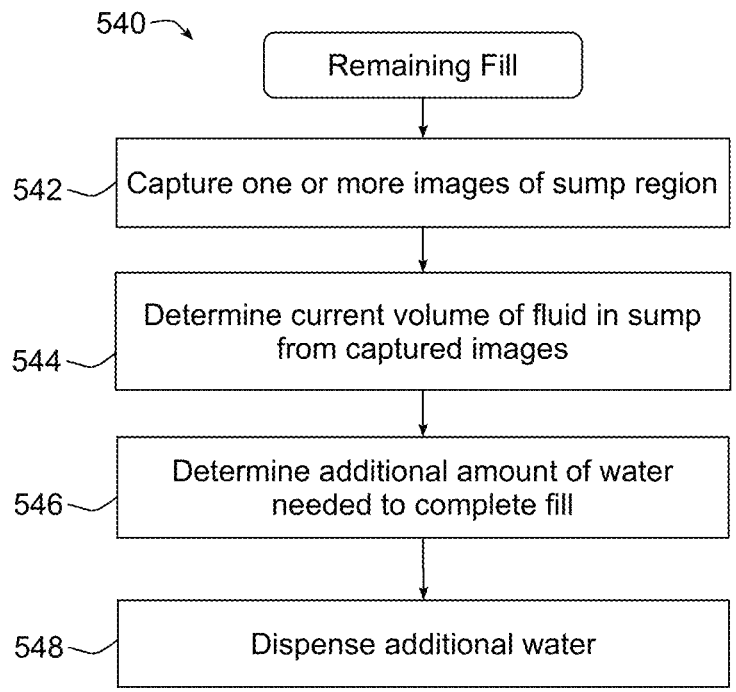
FIG. 25 is a flowchart illustrating an example sequence of operations for determining a remaining fill amount using the fluid level sensor of FIG. 22.

FIG. 25 next illustrates a process 540 for determining a remaining fill amount for performing a fill operation. For example, it may be desirable in some embodiments to determine a remaining fill amount during a fill operation when filling from an empty condition by executing process 540 one or more times during the fill operation. It may also be desirable in some embodiments to only partially drain a dishwasher and refill with clean water, e.g., for water conservation purposes, and thus process 540 may be used in some embodiments to determine an amount of water to use to refill the dishwasher.

In block 542, one or more images may be captured from a sump region using one or more imaging devices, and block 544 may then determine a current fluid level and a current volume of fluid in the sump based upon the current water level, e.g., using image analysis as discussed above. Next, block 546 may be used to determine an additional amount of water needed to fill the dishwasher, and block 548 may dispense the additional water, e.g., based upon a timed fill given a known fill rate of the inlet valve.

Filter Cleaning

In addition, in some embodiments of the invention, it may be desirable to implement filter cleaning to clean a filter of debris in the sump of the dishwasher. Filter cleaning may be desirable, for example, when debris is detected on the filter, e.g., with an imaging system. In addition, filter cleaning may be performed in some embodiments in response to detection of a slow drain or overflow condition.

Figure 26:
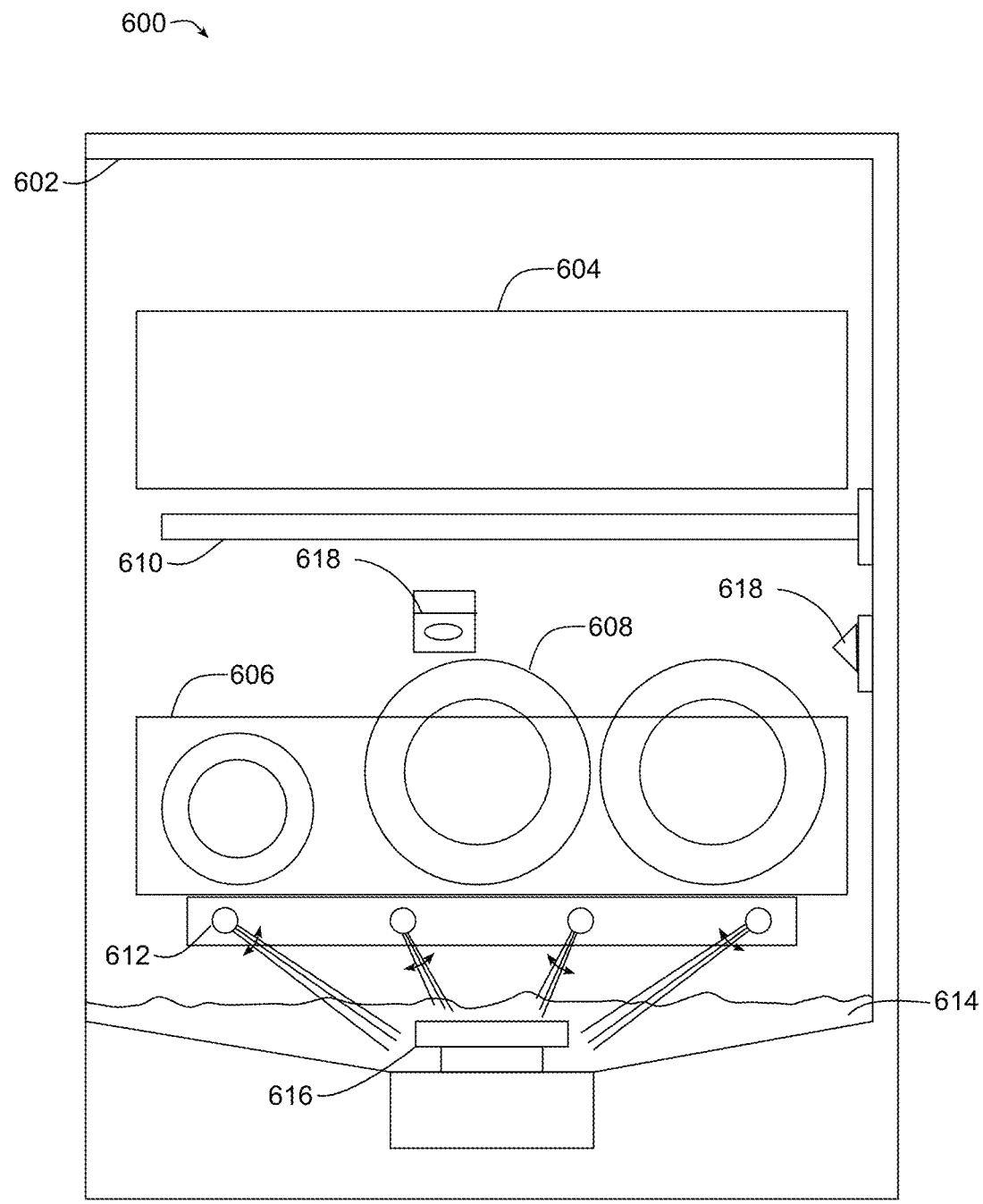
FIG. 26 is a side cross-sectional view of a dishwasher including filter cleaning consistent with some embodiments of the invention.

FIG. 26, for example, illustrates an example dishwasher 600 including a wash tub 602 and upper and lower racks 604, 606 for holding one or more utensils 608. In this embodiment, arrays of wall-mounted tubular spray elements 610, 612 are disposed below each of racks 604, 606, with tubular spray elements 610 mounted to a rear wall of wash tub 602 and tubular spray elements 612 mounted to a side wall of wash tub 602 such that tubular spray elements 612 extend generally transversely to tubular spray elements 610. In other embodiments, tubular spray elements 610 and/or 612 may be rack-mounted, and in other embodiments other positions, numbers, and arrangements of tubular spray elements may be used. Further, in other embodiments, other sprayers (e.g., controllably-movable sprayers) may be used in addition to or in lieu of tubular spray elements.

Dishwasher 600 also includes a sump 614, and a filter 616 may be disposed within sump 614. Filter 616 may be implemented using any number of filter designs utilized in dishwashers, and may include multiple filters of differing coarseness, and may include removable and/or cleanable portions as will be appreciated by those of ordinary skill having the benefit of the instant disclosure.

Dishwasher 600 also includes an imaging system including one or more imaging devices 618, and in some embodiments, one or more of imaging devices 618 may have a field of view that includes filter 616 such that the cleanliness of the filter may be determined via image analysis of one or more images captured of the filter by the imaging device(s) 618.

Moreover, in the illustrated embodiment, dishwasher 600 includes one or more sprayers that may be used to focus a spray of fluid on the filter for the purpose of cleaning the filter. In some embodiments, the one or more sprayers may be fixed and/or dedicated sprayers that direct a flow of fluid towards the filter. In other embodiments, however, the one or more sprayers are controllably-movable sprayers that may be utilized for other purposes in a dishwasher, and then when filter cleaning is desired, controllably-redirected to direct a fluid of fluid towards the filter. For example, in dishwasher 600, lower tubular spray elements 612 may be used for filter cleaning when not being used for washing utensils in lower rack 606, among other potential uses described herein.

Figure 27:
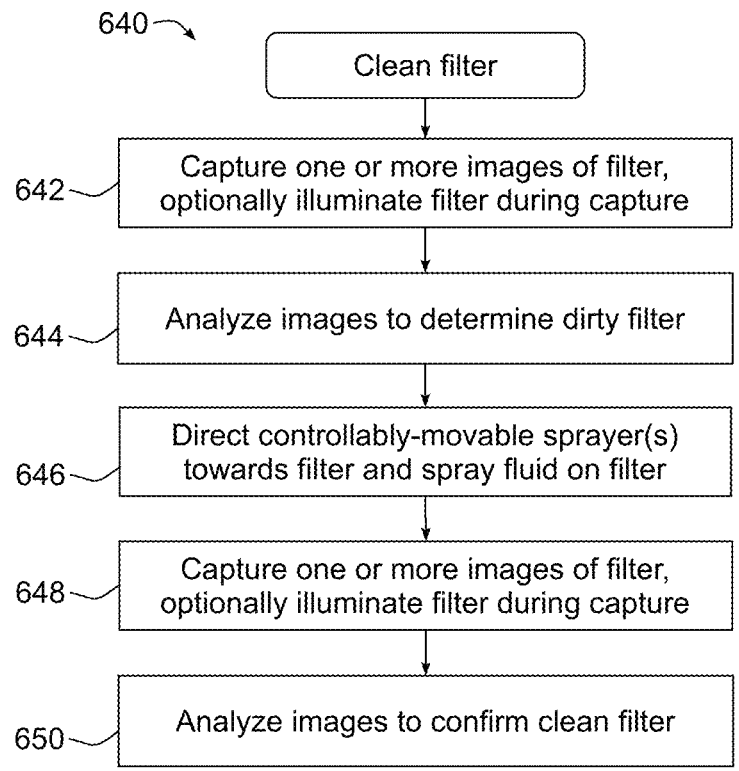
FIG. 27 is a flowchart illustrating an example sequence of operations for cleaning the filter of FIG. 26.

Filter cleaning may be performed, for example, on a periodic basis, e.g., after every N wash cycles. However, filter cleaning may also be performed on demand and/or on an as-needed basis based upon sensed conditions in the dishwasher. FIG. 27, for example, illustrates an example process 640 that may be implemented to clean filter 616 in dishwasher 600 in response to sensing debris in the filter via image analysis. Process 640 begins in block 642 by capturing one or more images of the filter, optionally with the filter being illuminated during capture using an illumination source within the dishwasher.

Next, in block 644, the images are analyzed to determine whether the filter is dirty. In some embodiments, for example, a machine learning module may be trained to distinguish between clean and dirty filters, and output a clean or dirty indication in response to the captured images. If determined to be dirty, block 646 may then direct one or more controllably-movable sprayers towards the filter to spray fluid on the filter. FIG. 26, for example, illustrates each of tubular spray elements 612 rotated to rotational positions that direct fluid towards the filter. In some embodiments, it may also be desirable to oscillate the tubular spray elements 612, e.g., to sweep a flow of fluid across the filter. In some embodiments, the sweep may be from top to bottom to assist in washing debris from the surface of the filter.

Returning to FIG. 27, after cleaning the filter, blocks 648 and 650 may optionally be performed to assess the filter cleaning operation. Block 648, for example, may capture one or more images (optionally while the filter is illuminated), and block 650 may analyze the images to confirm whether the filter is not clean. In other embodiments, however, no post-cleaning assessment may be made. If a post-cleaning assessment is performed and the filter is determined to still be dirty, the cleaning process may be repeated, or alternatively, a notification may be made to recommend manual cleaning or service.

Figure 28:
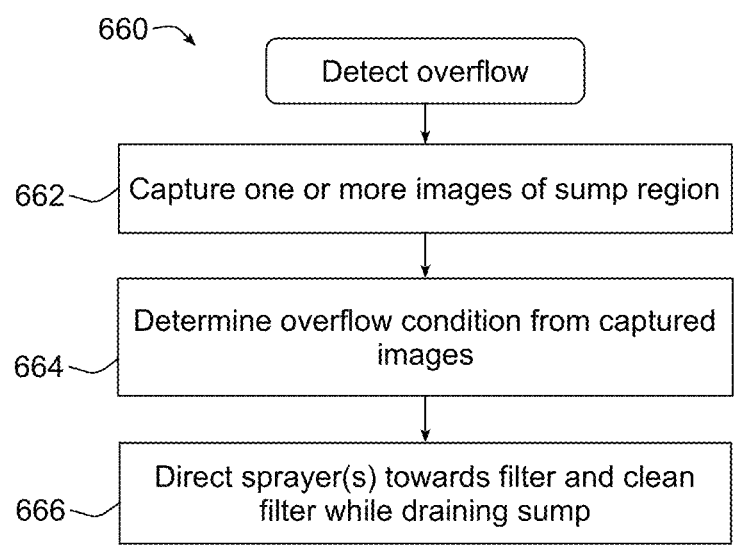
FIG. 28 is a flowchart illustrating an example sequence of operations for addressing an overflow condition in the dishwasher of FIG. 26.

FIG. 28 illustrates another process 660 that may be performed to initiate cleaning of a filter, in particular in response to an overflow condition in a sump. Process 660, for example, may begin in block 662 by capturing one or more images of the sump region of the dishwasher, and then in block 664 an overflow condition may be determined from the captured images, e.g., using the functionality described above in connection with determining fluid level. If such an overflow condition is detected, block 666 may be executed to direct one or more sprayers (whether controllably-movable or fixed) to clean the filter while draining the sump, thereby attempting to clear any blockages that are causing the overflow condition.

Figure 29:
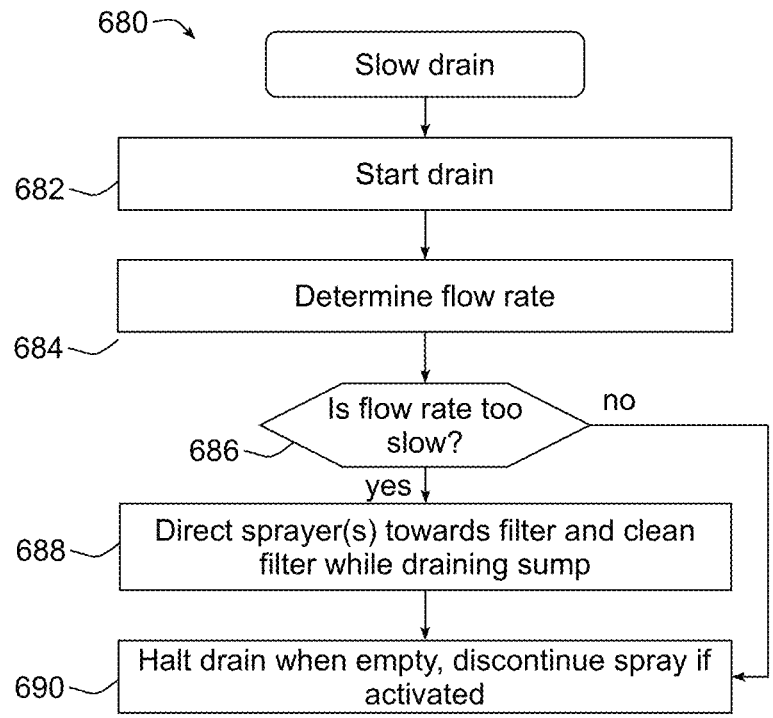
FIG. 29 is a flowchart illustrating an example sequence of operations for addressing a slow drain condition in the dishwasher of FIG. 26.

FIG. 29 illustrates another process 680 that may be used to initiate cleaning of the filter, in particular to address a slow draining condition detected in a dishwasher. Process 680 begins in block 682 by starting a drain of the dishwasher, e.g., by opening a drain valve and/or activating a drain pump. Then, while the drain occurs, block 684 determines a flow rate for the drain. Different manners of determining the flow rate may be used. In some embodiments, a flowmeter in the drain line may be used, while in other embodiments, fluid level sensing as described herein may be used to determine the drop in fluid level over time. In some instances, for example, a fluid level may be determined at each of a plurality of intervals, and a change in fluid volume over each interval may be determined therefrom. In other instances, a flow rate may be determined by calculating the amount of time it takes for the fluid level to drop to a landmark depth in the sump, e.g., the top surface of the filter or some other known depth in the sump, as the volume of water from the top of the filter or another landmark depth to the normal fill level is generally fixed based upon the geometry of the sump.

Once the flow rate is determined, block 686 determines whether the flow rate is too slow, e.g., whether the flow rate is below a rate threshold, or whether a calculated time to complete the drain out based upon the current flow rate exceeds a time threshold. If so, control passes to block 688 to direct one or more sprayers (whether controllably-movable or fixed) to clean the filter while draining the sump, thereby attempting to clear any blockages that are causing the slow drainage condition. Control then passes to block 690 to halt the drain operation once empty, and to discontinue spraying of the filter. Returning to block 686, if the flow rate is not too slow, block 688 is bypassed and draining continues until the sump is empty.

Tub Rinse Down

In still other embodiments, it may be desirable to utilize controllably-movable sprayers such as tubular spray elements to rinse down a dishwasher tub. In some embodiments, such a rinse down may be performed periodically, e.g., after N wash cycles, or may be performed at one or more points during a wash cycle. In other embodiments, however, it may be desirable to perform a rinse down in response to detecting excessive foaming in the dishwasher, e.g., during a wash cycle.

Figure 30:
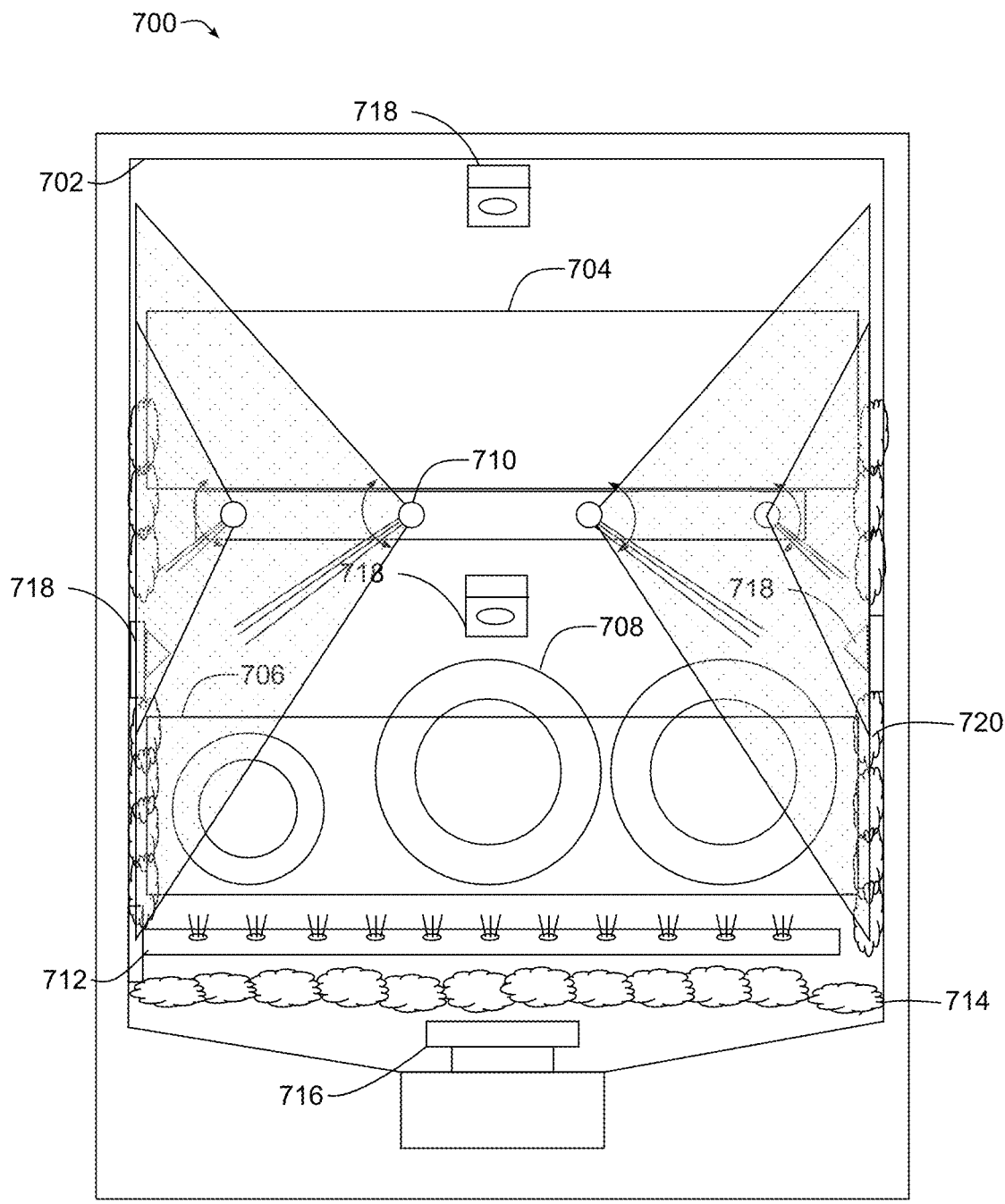
FIG. 30 is a front cross-sectional view of a dishwasher including tub rinse down functionality consistent with some embodiments of the invention.

FIG. 30, for example, illustrates an example dishwasher 700 including a wash tub 702 and upper and lower racks 704, 706 for holding one or more utensils 708. In this embodiment, arrays of wall-mounted tubular spray elements 710, 712 are disposed below each of racks 704, 706, with tubular spray elements 710 mounted to a rear wall of wash tub 702 and tubular spray elements 712 mounted to a side wall of wash tub 702 such that tubular spray elements 712 extend generally transversely to tubular spray elements 710. In other embodiments, tubular spray elements 710 and/or 712 may be rack-mounted, and in other embodiments other positions, numbers, and arrangements of tubular spray elements may be used. Further, in other embodiments, other sprayers (e.g., controllably-movable sprayers) may be used in addition to or in lieu of tubular spray elements.

Dishwasher 700 also includes a sump 714 including a filter 716. Dishwasher 700 also includes an imaging system including one or more imaging devices 718, and in some embodiments, one or more of imaging devices 718 may have a field of view that includes sump 714 and/or one or more walls of wash tub 702 such that any foam 720 disposed on a wall or in the sump may be assessed via image analysis.

Figure 31:
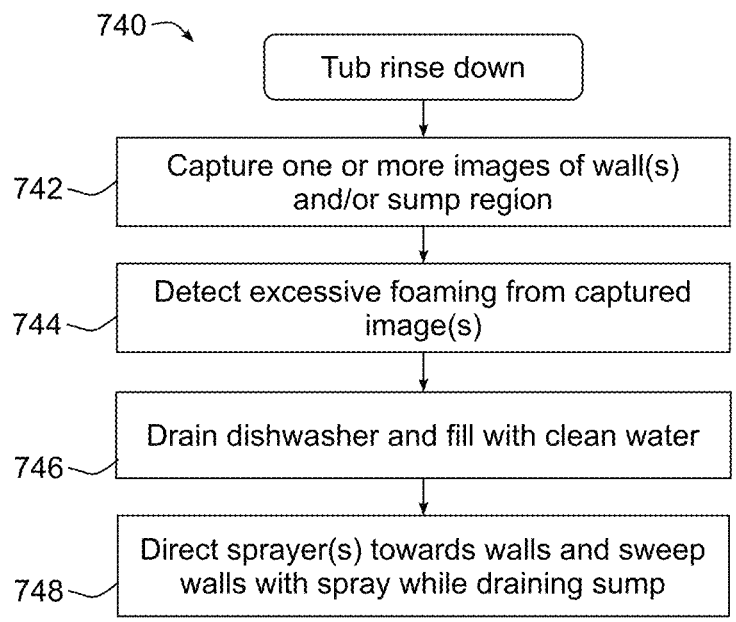
FIG. 31 is a flowchart illustrating an example sequence of operations for rinsing down the tub of FIG. 30.

FIG. 31, for example, illustrates a process 740 for rinsing down a wash tub in response to detection of excessive foaming. Process 740 begins in block 742 by capturing one or more images of the walls and/or sump region of the dishwasher. Block 744 then detects excessive foaming from the captured image(s), e.g., using a machine learning model trained to detect foam. If excessive foaming is detected, block 746 drains the dishwasher and refills with clean water. Block 748 then directs one or controllably-movable sprayers (e.g., one or more tubular spray elements) to rinse down the tub walls and sump. In some embodiments, for example, tubular spray elements in dishwasher 700 of FIG. 30 may be directed to rinse down from top to bottom, with tubular spray elements 710 sweeping from top to bottom along each tub wall, and with tubular spray elements 712 sweeping from the perimeter to the center of the sump. In other embodiments sweeps may start in the middles of the wall and sump and swept outwards therefrom. In addition, sweep rates may vary in different directions, e.g., to sweep slowly from top to bottom to allow water to flow down the tub walls, while sweeping up (or even turning off the tubular spray elements) when sweeping back up to the top. Other patterns may be used in other embodiments, so the invention is not limited to the specific sweep patterns discussed herein.

In addition, in some embodiments, foam detection as described herein may be used to notify a user and offer recommendations of how to eliminate foaming, e.g., via additives or removing utensils and hand rinsing in the sink, removing the foam by hand, etc. Such notifications may be via the dishwasher user interface, via a mobile app, via an email or text, or in other suitable manners.

Imaging System Cleaning

In still other embodiments, it may be desirable to utilize controllably-movable sprayers such as tubular spray elements to clean the imaging system. In some embodiments, such a cleaning operation may be performed periodically, e.g., after N wash cycles, or may be performed at one or more points during a wash cycle, to ensure that the imaging devices in the imaging system are capable of capturing clean images within the dishwasher. In some embodiments, for example, it may be desirable to spray off each imaging device near the end of a rinse operation of a wash cycle to maintain the cleanliness of the imaging system. In other embodiments, however, it may be desirable to perform a cleaning operation specifically in response to detecting a blocked imaging device, e.g., during a wash cycle.

Figure 32:
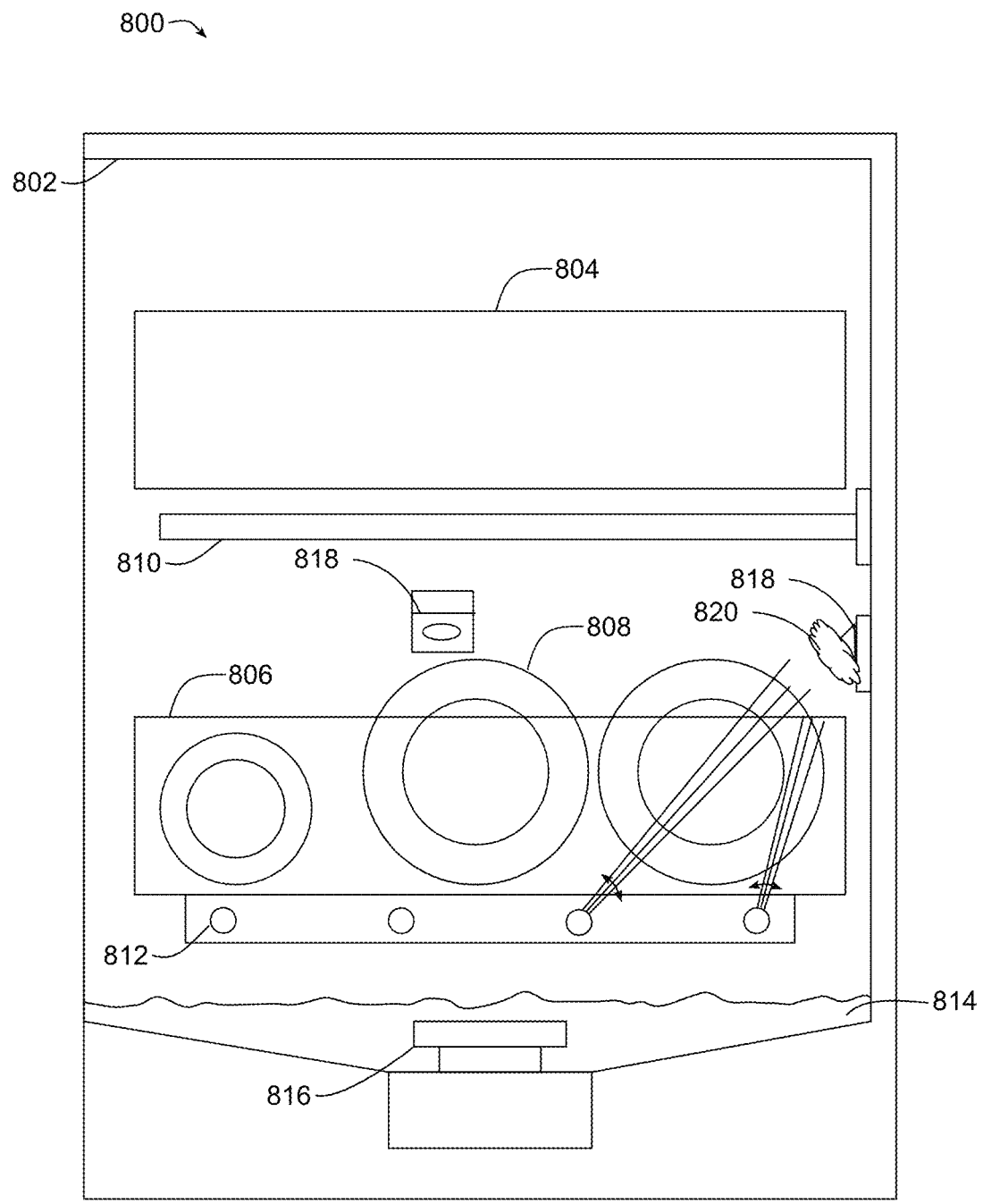
FIG. 32 is a side cross-sectional view of a dishwasher consistent with some embodiments of the invention.

FIG. 32, for example, illustrates an example dishwasher 800 including a wash tub 802 and upper and lower racks 804, 806 for holding one or more utensils 808. In this embodiment, arrays of wall-mounted tubular spray elements 810, 812 are disposed below each of racks 804, 806, with tubular spray elements 810 mounted to a rear wall of wash tub 802 and tubular spray elements 812 mounted to a side wall of wash tub 802 such that tubular spray elements 812 extend generally transversely to tubular spray elements 810. In other embodiments, tubular spray elements 810 and/or 812 may be rack-mounted, and in other embodiments other positions, numbers, and arrangements of tubular spray elements may be used. Further, in other embodiments, other sprayers (e.g., controllably-movable sprayers) may be used in addition to or in lieu of tubular spray elements.

Dishwasher 800 also includes a sump 814 including a filter 816. Dishwasher 800 also includes an imaging system including one or more imaging devices 818, and in some embodiments, one or more of imaging devices 818 may become blocked during a wash cycle, e.g., due to the presence of foam 820, food particles, or other debris.

Figure 33:
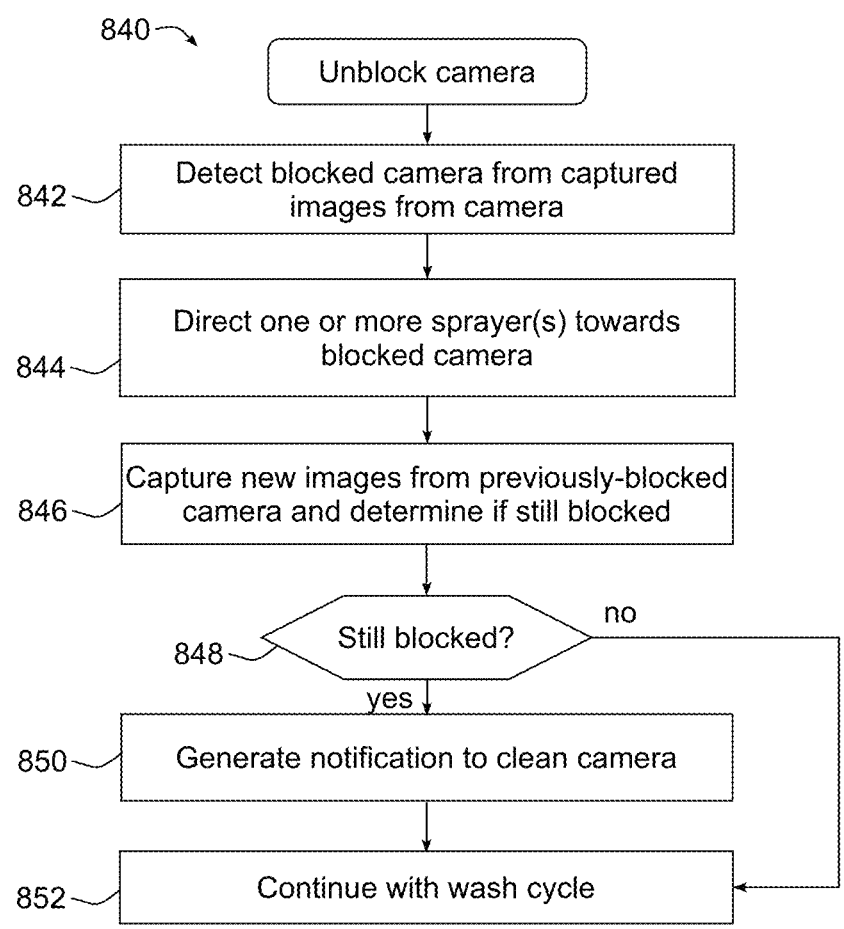
FIG. 33 is a flowchart illustrating an example sequence of operations for unblocking an imaging device in the dishwasher of FIG. 32.

FIG. 33, for example, illustrates a process 840 for unblocking a camera or imaging device. Process 840 begins in block 842 by detecting a blocked camera or imaging device in the imaging system, e.g., based upon image analyses of captured images from that imaging device. In some embodiments, for example, a machine learning model may be trained to detect when an imaging device is partially or completely blocked, e.g., due to the presence of distinctive patterns associated with foam or other debris occluding a major portion of the field of view for the imaging device.

In response to detecting any debris or other occlusion of an imaging device, block 844 then directs one or more sprayers towards the blocked imaging device. In addition, in some embodiments, if the imaging device is controllably-movable, the imaging device may also be directed to point its lens in a suitable orientation for being sprayed off. Then, after the imaging device is sprayed for a predetermined time, blocks 846-850 may optionally be performed to confirm that the imaging device has been sufficiently cleaned. Block 846 captures new images from the previously-blocked imaging device and determines whether or not the imaging device is still blocked (e.g., based upon the absence of a blockage detected in the manner described above in connection with block 842). If still blocked, block 848 passes control to block 850 to generate a notification to clean the imaging device, e.g., via a user interface, mobile app, text message, etc., whereby upon receipt of the notification a user or service personnel may be prompted to manually clean the imaging device. In addition, in some embodiments, a cleaning operation may be repeated one or more times prior to generating a notification. Block 852 then continues with the wash cycle. In addition, returning to block 848, if the imaging device is no longer blocked, block 850 is skipped, and block 852 resumes the wash cycle, now with an unblocked imaging device able to capture images during the wash cycle for one or more of the various purposes described herein.

Remote Viewing

It may also be desirable to utilize an imaging system in a dishwasher for remote viewing of the contents of the dishwasher. In some embodiments, for example, any of the aforementioned imaging system implementations (e.g., as discussed above in connection with FIGS. 5-6) may be used to capture still and/or video images from the inside of a dishwasher to permit remote viewing of the inside of the dishwasher.

Figure 34:
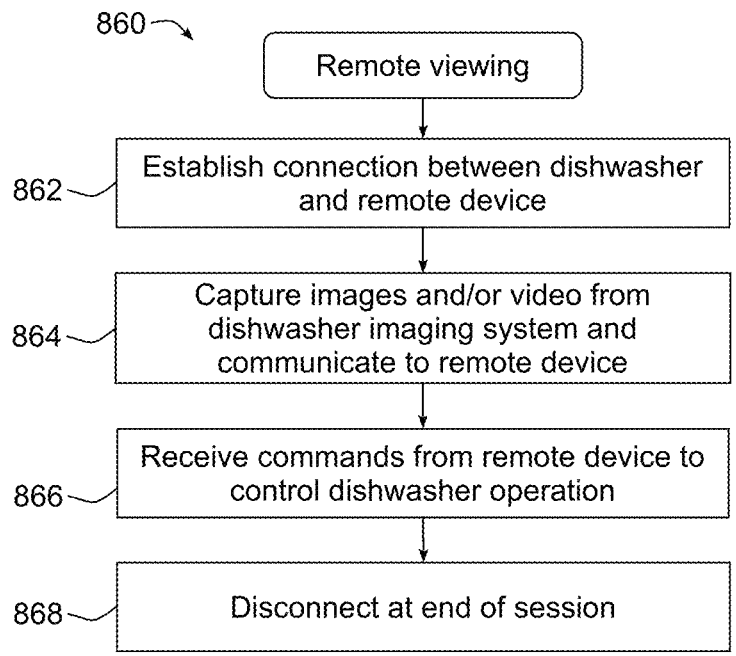
FIG. 34 is a flowchart illustrating an example sequence of operations for performing remote viewing of a dishwasher consistent with some embodiments of the invention.

As one example, and as illustrated by process 860 of FIG. 34, it may be desirable to support remote viewing for service or diagnostic purposes. It may be desirable, for example, for a customer communicating with a manufacturer or service organization about a problem with his or her dishwasher to enable the dishwasher to be viewed by a remote device such as a remote desktop, mobile device, tablet, laptop computer, etc. and thereby enable a user of the remote device to see any potential problems during or between wash cycles. As another example, an onsite service person may communicate with a remote device to seek additional diagnostic assistance.

Process 860 begins in block 862 by establishing a connection between the dishwasher and the remote device. Doing so may include, for example, sending a request to the dishwasher from an app running on the remote device and accepting the request on a user interface of the dishwasher. Once a connection is established, still and/or video images may be captured by one or more imaging devices in the dishwasher imaging system and forwarded and/or streamed to the remote device. Moreover, as illustrated in block 864, commands may be issued to the dishwasher by the remote device, e.g., to change a field of view of an imaging device, to start/stop the dishwasher, to controllably-move one or more sprayers, to activate/deactivate various components in the dishwasher. Then, once the session is complete, the connection may be terminated in block 868.

Figure 35:
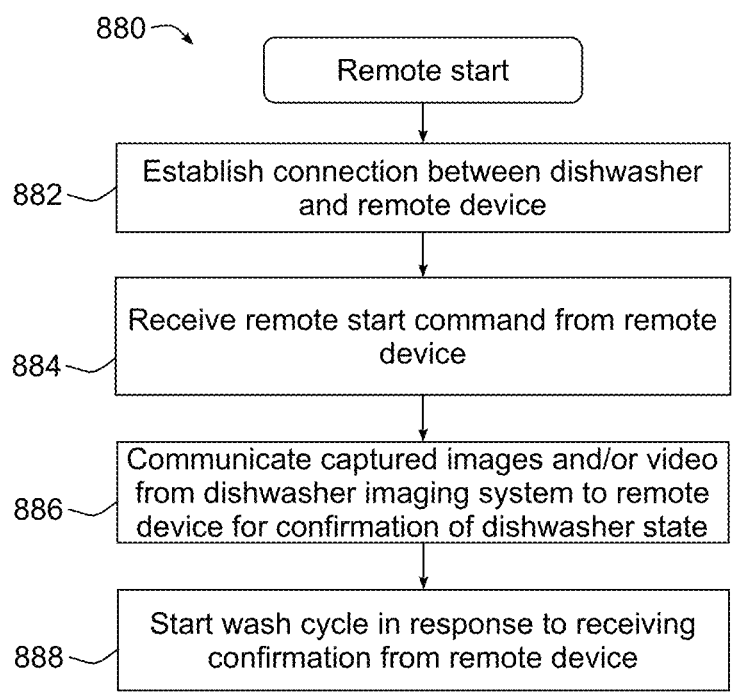
FIG. 35 is a flowchart illustrating an example sequence of operations for performing a remote start of a dishwasher consistent with some embodiments of the invention.

Process 880 of FIG. 35 illustrates another use of remote viewing, in connection with remote starting of a dishwasher. It will be appreciated that in many conventional dishwasher designs, remote start is of limited utility due to the fact that a user is often required to enable a dishwasher for remote start through the physical user interface of the dishwasher (e.g., a physical button, touch screen or other control disposed on the dishwasher itself), and the fact that if the dishwasher door is ever opened after enabling the remote start, the remote start mode is generally disabled because it can no longer be assured that the contents of the dishwasher have not changed since the mode was enabled. However, through the use of remote viewing, a user may be able in some embodiments to remotely start a dishwasher after being presented with captured image(s) from the dishwasher when the remote start operation is being initiated so that the user can be assured that the contents of the dishwasher are ready to be washed.

Process 880 therefore begins in block 882 by establishing a connection between the dishwasher and a remote device, e.g., via an app on a mobile device. Then, in block 884, a remote start command is received from the remote device. Prior to initiating the remote start operation, however, block 886 captures one or more still or video images from the inside of the dishwasher (optionally, with the aid of an illumination source) and communicates those images to the remote device for confirmation of the dishwasher state. If, after viewing the images the user still wishes to start the dishwasher, the user may then confirm that desire in the mobile app, and block 888 starts the wash cycle in response to that confirmation. Thus, a user is presented with a view of the inside of the dishwasher prior to a remote start to ensure that the dishwasher is in a state suitable for performing a wash cycle (e.g., containing only dirty utensils and no other objects). In addition, in such instances, a remote start may be authorized even if the door of the dishwasher has been opened since the last time the user interacted with a physical user interface of the dishwasher.

Conclusion

It will be appreciated that the analysis of images captured by an imaging device, and the determination of various conditions reflected by the captured images, may be performed locally within a controller of a dishwasher in some embodiments. In other embodiments, however, image analysis and/or detection of conditions based thereon may be performed remotely in a remote device such as a cloud-based service, a mobile device, etc. In such instances, image data may be communicated by the controller of a dishwasher over a public or private network such as the Internet to a remote device for processing thereby, and the remote device may return a response to the dishwasher controller with result data, e.g., an identification of certain features detected in an image, an identification of a condition in the dishwasher, an value representative of a sensed condition in the dishwasher, a command to perform a particular action in the dishwasher, or other result data suitable for a particular scenario. Therefore, while the embodiments discussed above have predominantly focused on operations performed locally within a dishwasher, the invention is not so limited, and some or all of the functionality described herein may be performed externally from a dishwasher consistent with the invention.

Various additional modifications may be made to the illustrated embodiments consistent with the invention. Therefore, the invention lies in the claims hereinafter appended.

What is claimed is:
1. A dishwasher, comprising:
a wash tub including a sump;
an imaging device positioned above the sump and configured to capture images of the sump;

an illumination source disposed in the sump and directed at the imaging device; and a controller coupled to the imaging device and the illumination source and configured to sense a turbidity of a fluid disposed in the sump by:
controlling the illumination source to emit light;
controlling the imaging device to capture one or more images of the sump while light is emitted by the illumination source; and
determining a value representative of the turbidity of the fluid disposed in the sump based upon a sensed light intensity for the illumination source in the captured one or more images.

2. A dishwasher, comprising:
a wash tub including a sump;
an imaging device positioned outside of the sump and configured to capture images of the sump, wherein the imaging device is positioned above the sump and above a maximum fluid level for the sump to capture images of the fluid through a top surface of the fluid;
an illumination source configured to illuminate a portion of the sump within the field of view of the imaging device; and
a controller coupled to the imaging device and configured to sense turbidity of a fluid disposed in the sump by controlling the imaging device to capture one or more images of the sump from which a condition of the fluid in the sump may be determined while the illumination source illuminates the portion of the sump, wherein the controller is further configured to perform a calibration operation by controlling the imaging device to capture one or more images of the sump while the illumination source illuminates the portion of the sump and when clean water is disposed in the sump for use in determining a baseline light intensity for clear water such that the condition of the fluid in the sump may be determined based in part on a comparison of a light intensity sensed in the captured one or more images with the baseline light intensity, and wherein the controller is further configured to control the imaging device to capture one or more additional images within the dishwasher to perform a non-fluid condition sensing operation in the dishwasher.

3. The dishwasher of claim 2, wherein the non-fluid condition sensing operation is a load sensing operation, an object sensing operation, a soil sensing operation, remote viewing operation, a detergent sensing operation, a filter sensing operation, a filter cleaning operation, a fluid level sensing operation, a sprayer position sensing operation, a self-cleaning operation or a diagnostic operation.

4. The dishwasher of claim 2, wherein the imaging device is disposed on a wall of the wash tub and above the sump.

5. The dishwasher of claim 4, wherein the imaging device has a fixed field of view directed at the sump.

6. The dishwasher of claim 4, wherein the imaging device has a controllably-varied field of view, and wherein the controller is configured to control the imaging device to direct the field of view thereof at the sump when sensing the condition of the fluid disposed in the sump.

7. The dishwasher of claim 2, further comprising:
a tubular spray element disposed in the wash tub and being rotatable about a longitudinal axis thereof, the tubular spray element including one or more apertures extending through an exterior surface thereof, and the tubular spray element in fluid communication with a fluid supply to direct fluid from the fluid supply into the wash tub through the one or more apertures; and a tubular spray element drive coupled to the tubular spray element and configured to rotate the tubular spray element between a plurality of rotational positions about the longitudinal axis thereof;
wherein the controller is coupled to the tubular spray element drive and configured to control the tubular spray element drive to discretely direct the tubular spray element to each of a plurality of rotational positions.

8. The dishwasher of claim 7, wherein the imaging device is coupled to the tubular spray element such that the controller controls a field of view of the imaging device using the tubular spray element drive.

9. The dishwasher of claim 2, wherein the controller is further configured to sense the condition of the fluid disposed in the sump by determining from the captured one or more images a value representative of the condition of the fluid disposed in the sump.

10. The dishwasher of claim 2, wherein the controller is further configured to sense the condition of the fluid disposed in the sump by communicating the captured one or more images to a remote device that determines a value representative of the condition of the fluid disposed in the sump, and receiving the determined value from the remote device.

11. The dishwasher of claim 2, wherein the illumination source generates white light, red light, green light, a pattern of light, or infrared light.

12. The dishwasher of claim 2, wherein the condition of the fluid disposed in the sump is determined based upon attenuation of light emitted by the illumination source.

13. The dishwasher of claim 2, wherein the illumination source is disposed in the sump, and wherein the condition of the fluid is sensed based upon direct illumination by the illumination source.

14. The dishwasher of claim 2, further comprising a reflective element disposed in the sump, wherein the condition of the fluid is sensed based upon indirect illumination by the illumination source that is reflected by the reflective element.

15. The dishwasher of claim 2, wherein the controller is further configured to determine a load cleanliness or a rate of soil removal based at least in part on the sensed condition of the fluid disposed in the sump.

16. The dishwasher of claim 15, further comprising an imaging system including the imaging device, wherein the controller is configured to determine the load cleanliness or the rate of soil removal further based at least in part on one or more images captured of a load in the dishwasher by the imaging system.

17. The dishwasher of claim 2, wherein the controller is further configured to determine when to complete a wash or rinse operation performed during a wash cycle based at least in part on the sensed condition of the fluid disposed in the sump.

18. The dishwasher of claim 2, wherein the condition is turbidity.

19. A method of sensing condition of a fluid disposed in a sump of a dishwasher, the method comprising:
performing image analysis on one or more images of the sump of the dishwasher captured using an imaging device positioned outside of the sump and while a portion of the sump within the field of view of the imaging device is illuminated by an illumination source disposed in the sump; and
determining the condition of the fluid based upon the image analysis performed on the captured one or more images, wherein the condition of the fluid is determined based upon direct illumination from the illumination source.

20. The method of claim 19, wherein the imaging device has a controllably-varied field of view, the method further comprising controlling the imaging device to direct the field of view thereof at the sump when sensing the condition of the fluid disposed in the sump.

21. The method of claim 19, further comprising performing a calibration operation by controlling the imaging device to capture one or more images of the sump when clean water is disposed in the sump for use in determining a baseline light intensity for clear water such that the condition of the fluid in the sump may be determined based in part on a comparison of a light intensity sensed in the captured one or more images with the baseline light intensity.

* * * * *